United States Patent
Galil et al.

(10) Patent No.: US 11,630,774 B2
(45) Date of Patent: Apr. 18, 2023

(54) PREVENTING OVERWRITING OF SHARED MEMORY LINE SEGMENTS

(71) Applicant: Mobileye Vision Technologies Ltd., Jerusalem (IL)

(72) Inventors: Eran Galil, Ramat Yishai (IL); Yosef Kreinin, Jerusalem (IL)

(73) Assignee: Mobileye Vision Technologies Ltd., Har Hotzvim (IL)

( * ) Notice: Subject to any disclaimer, the term of this patent is extended or adjusted under 35 U.S.C. 154(b) by 0 days.

(21) Appl. No.: 17/483,945

(22) Filed: Sep. 24, 2021

(65) Prior Publication Data
US 2022/0100659 A1 Mar. 31, 2022

Related U.S. Application Data
(60) Provisional application No. 63/084,091, filed on Sep. 28, 2020.

(51) Int. Cl.
*G06F 12/0815* (2016.01)
*G06F 13/16* (2006.01)
*G06F 12/084* (2016.01)

(52) U.S. Cl.
CPC ........ *G06F 12/0815* (2013.01); *G06F 12/084* (2013.01); *G06F 13/1668* (2013.01); *G06F 2212/1032* (2013.01)

(58) Field of Classification Search
None
See application file for complete search history.

(56) References Cited

U.S. PATENT DOCUMENTS
| | | | |
|---|---|---|---|
| 10,073,778 B1 * | 9/2018 | Agarwal | G06F 12/0817 |
| 2018/0373630 A1 | 12/2018 | Penton et al. | |

FOREIGN PATENT DOCUMENTS
| | | | |
|---|---|---|---|
| JP | H04084347 A | 3/1992 | |
| JP | H04195563 A | 7/1992 | |
| JP | H05282208 A | 10/1993 | |
| JP | H07191946 A | 7/1995 | |
| JP | 2006501563 A | 1/2006 | |
| JP | 2009015509 A | 1/2009 | |
| JP | 2017072908 A | 4/2017 | |
| JP | 2018109965 A | 7/2018 | |
| WO | 2008155844 A1 | 12/2008 | |

OTHER PUBLICATIONS
Nov. 24, 2022 (JP) Decision to Grant a Patent—App. 2021-156813.

* cited by examiner

*Primary Examiner* — Charles J Choi
(74) *Attorney, Agent, or Firm* — Banner & Witcoff Ltd.

(57) ABSTRACT

Techniques are disclosed for preventing overwriting of shared line segments. The techniques include sending a data unit from a first processor to second processor using an augmented hardware cache coherency protocol, the augmented hardware cache coherency protocol being augmented to maintain dirty bits information during an exchange of the data unit within a cache coherency domain. A size of the data unit is a fraction of a size of any shared line of a shared memory, and writing the data unit to a segment of a shared line of a shared memory includes using another protocol, without overwriting another segment of the shared line. The writing is based at least in part on the dirty bits information, and the other protocol does not support hardware coherency and maintains the dirty bits information.

20 Claims, 11 Drawing Sheets

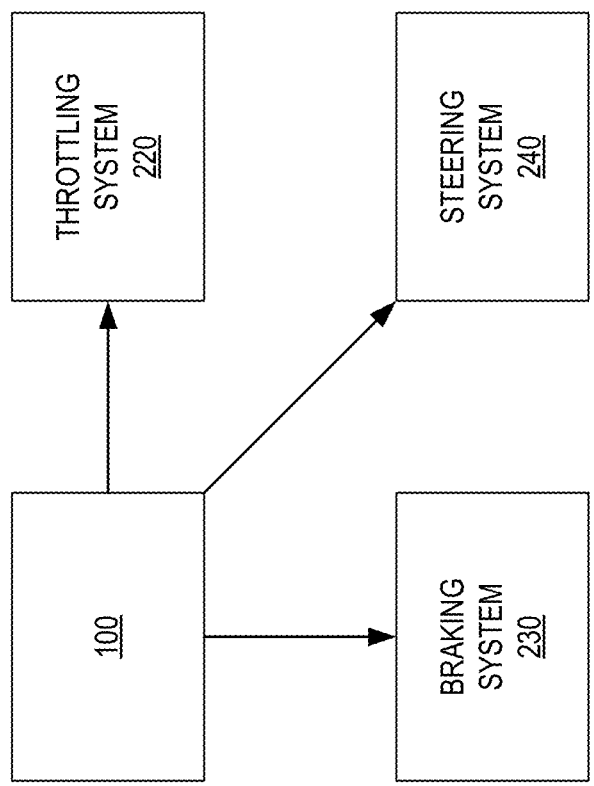

PREVENTING OVERWRITING OF SHARED MEMORY LINE SEGMENTS

CROSS-REFERENCE TO RELATED APPLICATIONS

The present application claims the benefit of the filing date of U.S. provisional application No. 63/084,091, filed on Sep. 28, 2020, the contents of which are incorporated herein by reference in their entirety.

TECHNICAL FIELD

The disclosure relates to the technical field of shared memory and, in particular, to techniques for preventing overwriting of line segments that are shared between different processing units.

BACKGROUND

Advanced driver assistance systems (ADAS) and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected, its location, etc.

As ADAS and AV systems progress towards fully autonomous operation, it would be beneficial to protect data generated by these systems.

Moreover, system on chips (SoCs) may be implemented as part of ADAS and/or AV systems. SoCs include a variety of processing units, memory units, and other units that may exchange data in various manners and using different protocols. SoCs may implement memory that is shared among the various processing units. For instance, the shared memory may have an architecture such that lines of the shared memory are shared between different processing units of the SoC. One type of sharing involves allocating different shared line segments to different processing units so that different processing units may modify their allocated shared line segment without overwriting the other shared line segments that are allocated to other processing units. This is typically achieved via the use of "dirty bits," which indicate which shared line segments can and cannot be written to by specific processing units.

Various techniques have been proposed to manage the transfer of data and interoperability of the different processing units of the SoC. For instance, the ARM Advanced Microcontroller Bus Architecture (AMBA™) is an open-standard, on-chip interconnect specification for the connection and management of functional blocks for such system-on-a-chip (SoC) designs (see: www.wikipedia.org). AMBA™ facilitates the development of multi-processor designs with large numbers of controllers and peripherals with a bus architecture. AMBA™ was introduced by ARM in 1996. In 2003, ARM introduced the third generation, AMBA™ 3, including Advanced Extensible Interface (AXI) and the Advanced Trace Bus (ATB) as part of the CoreSight on-chip debug and trace solution. In 2011, ARM introduced AMBA™ 4, which includes AXI coherency extension (ACE) protocol.

It has been found that the aforementioned dirty bits may be deleted in various scenarios that involve sending data units using different protocols—especially when a first processor modifies a data unit and a second processor (that shares the cache coherency domain with the first processor) requests to retrieve the data unit. In such a case, i.e. when dirty bits are removed from a communication and/or do not reach a certain processing unit, then the processing unit may overwrite data segments that are not allocated to that processing unit. Thus, there is a growing need to provide a solution that will prevent overwriting of data units in a shared memory.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

The disclosed embodiments provide systems and methods that can be used as part of or in combination with autonomous navigation/driving and/or driver assist technology features. Driver assist technology refers to any suitable technology to assist drivers in the navigation and/or control of their vehicles, such as FCW, LDW and TSR, as opposed to fully autonomous driving. In various embodiments, the system may include one, two, or more cameras mountable in a vehicle, and an associated processor that monitors the environment of the vehicle. In further embodiments, additional types of sensors can be mounted in the vehicle and can be used in the autonomous navigation and/or driver assist system. In some examples of the presently disclosed subject matter, the system may provide techniques for processing images of an environment ahead of a vehicle navigating a road for training a neural networks or deep learning algorithms to estimate a future path of a vehicle based on images. In yet further examples of the presently disclosed subject matter, the system may provide techniques for processing images of an environment ahead of a vehicle navigating a road using a trained neural network to estimate a future path of the vehicle.

There are provided herein systems and methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor, and the like.

As discussed in further detail herein, the disclosed embodiments may include a method, device, and a computer readable medium (e.g. a non-transitory computer readable medium) for preventing overwriting of a shared memory line segment.

BRIEF DESCRIPTION OF THE DRAWINGS/FIGURES

The subject matter of the aspects of the present disclosure is particularly pointed out and distinctly claimed in the concluding portion of the specification. The disclosure, however, both as to organization and method of operation, together with objects, features, and advantages thereof, may best be understood by reference to the following detailed description when read with the accompanying drawings, in which:

FIG. 2E is a diagrammatic representation of exemplary vehicle control systems consistent with the disclosed embodiments;

DETAILED DESCRIPTION

Figure 1:
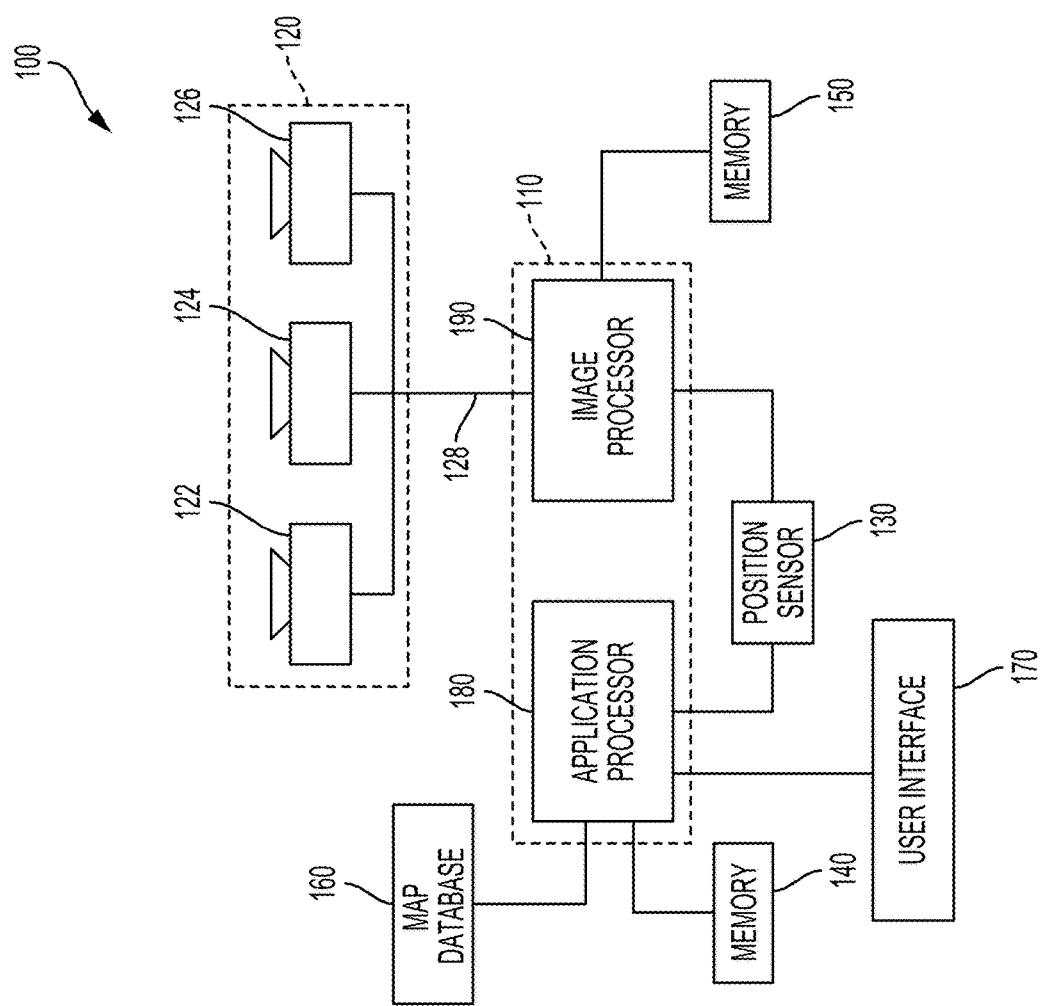
FIG. 1 is a block diagram representation of a system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure.

The subject matter regarded as the disclosure is particularly pointed out and distinctly claimed in the concluding portion of the specification. The disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present disclosure may, for the most part, be implemented using electronic components and circuits known to those skilled in the art, details will not be explained in any greater extent than that considered necessary as illustrated above, for the understanding and appreciation of the underlying concepts of the present disclosure and to not obfuscate or distract from the teachings of the present disclosure.

Any reference in the specification to a method should be applied mutatis mutandis to a system capable of executing the method, and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device, and should be applied mutatis mutandis to a non-transitory computer readable medium that stores instructions that may be executed by the memory device.

Any reference in the specification to a non-transitory computer readable medium should be applied mutatis mutandis to a system capable of executing the instructions stored in the non-transitory computer readable medium, and should be applied mutatis mutandis to method that may be executed by a computer that reads the instructions stored in the non-transitory computer readable medium.

Any combination of any module or unit listed in any of the figures, any part of the specification and/or any claims, may be provided. Especially, any combination of any claimed feature may be provided.

A pixel may be a picture element obtained by a camera, and may be a processed picture element.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances, and can result from other types of image data and also from data that is not image based or is not exclusively image based, as well.

Section I
A. Vehicle Systems and Operation

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120, and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition units and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition unit 120. For example, data interface 128 can include any wired and/or wireless link or links for transmitting image data acquired by image acquisition unit 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors, and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP®, and the DMA, the second MIPS34K CPU and the multi-channel DMA, as well as the other peripherals. The five VCEs, three VMP®, and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 110. In another instance, the memory can be integrated into the processing unit 110.

Each memory 140, 150 can include software instructions that, when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices, and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a RF sensor (e.g., radar transceiver), a LIDAR sensor, etc. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
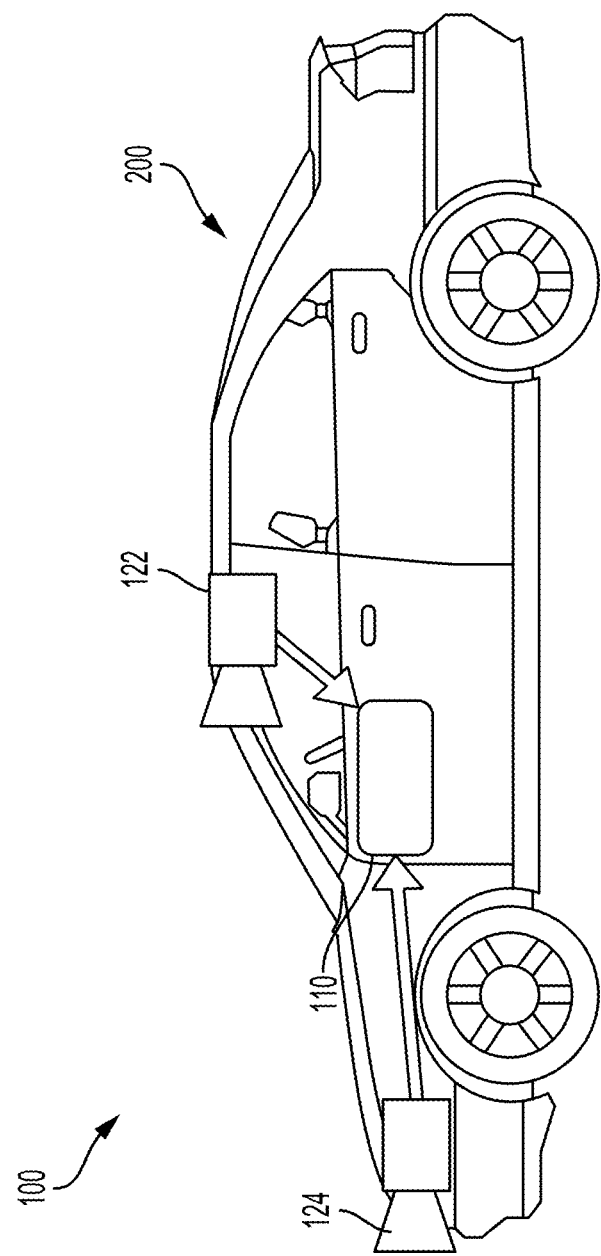
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3A-3C, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and may not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver, and may also include a map database 160 and memory units 140 and 150.

Figure 2B:
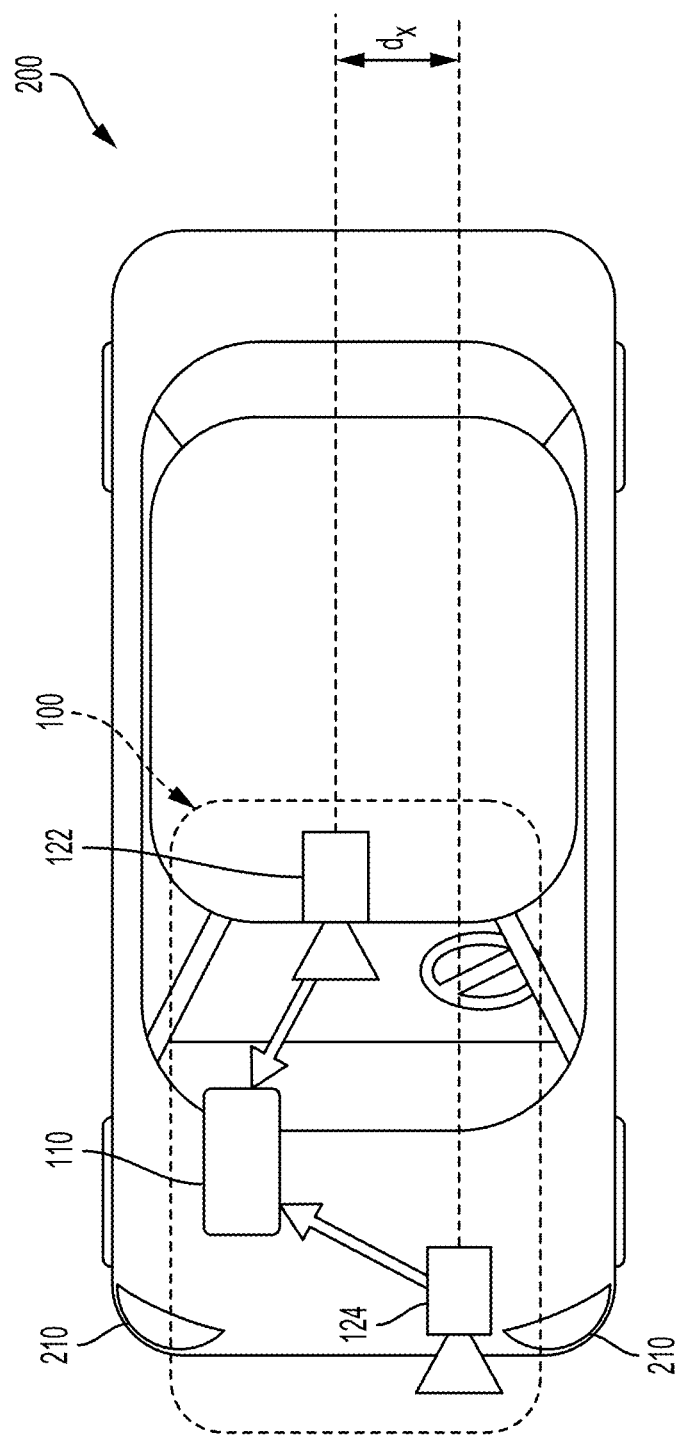
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
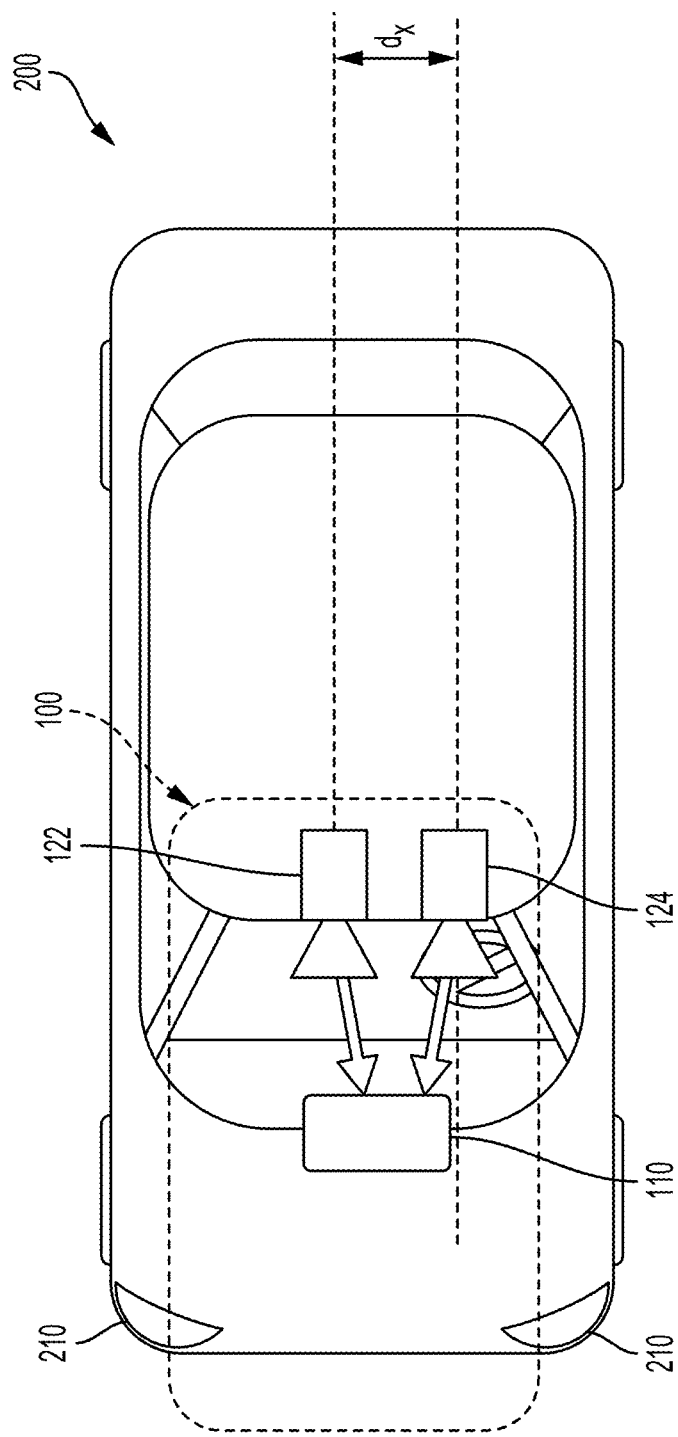
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
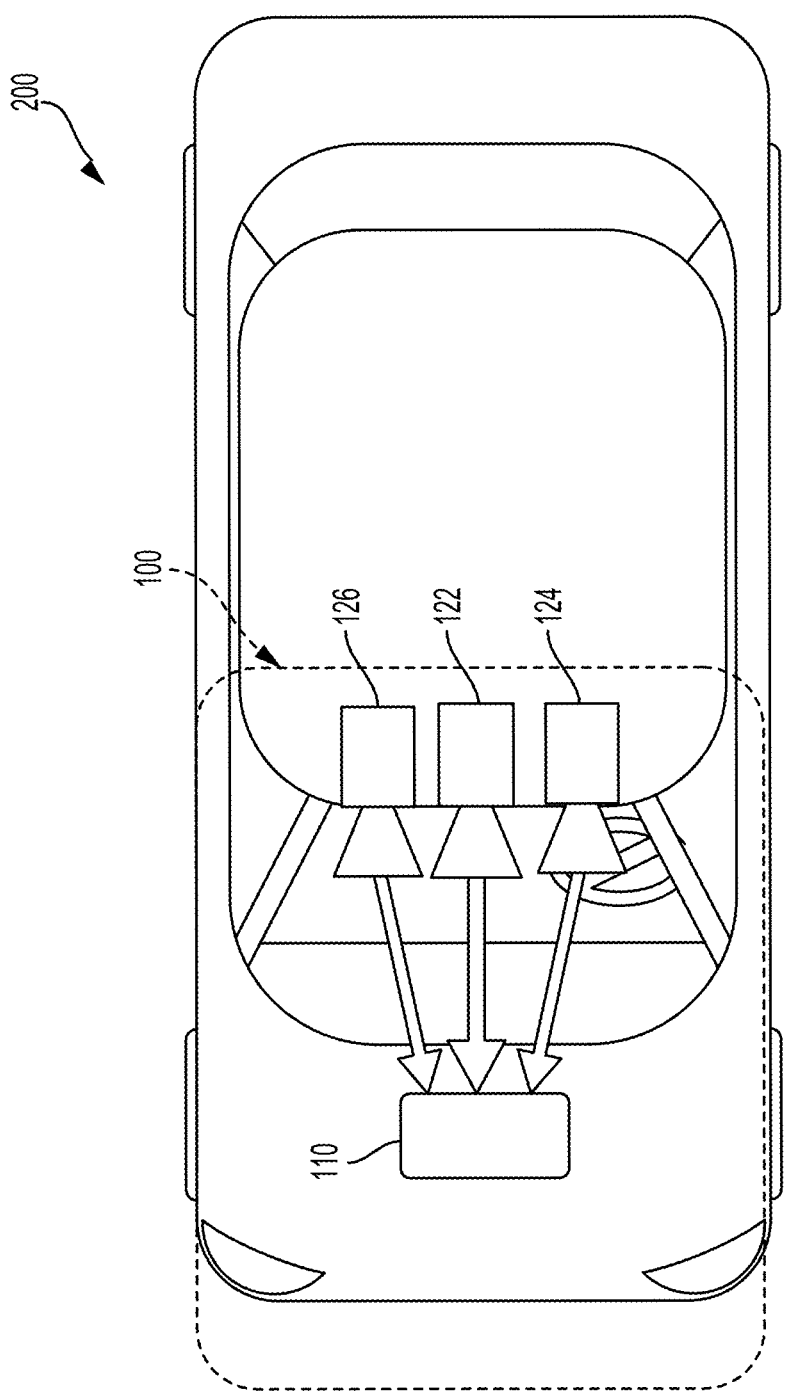
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200, and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
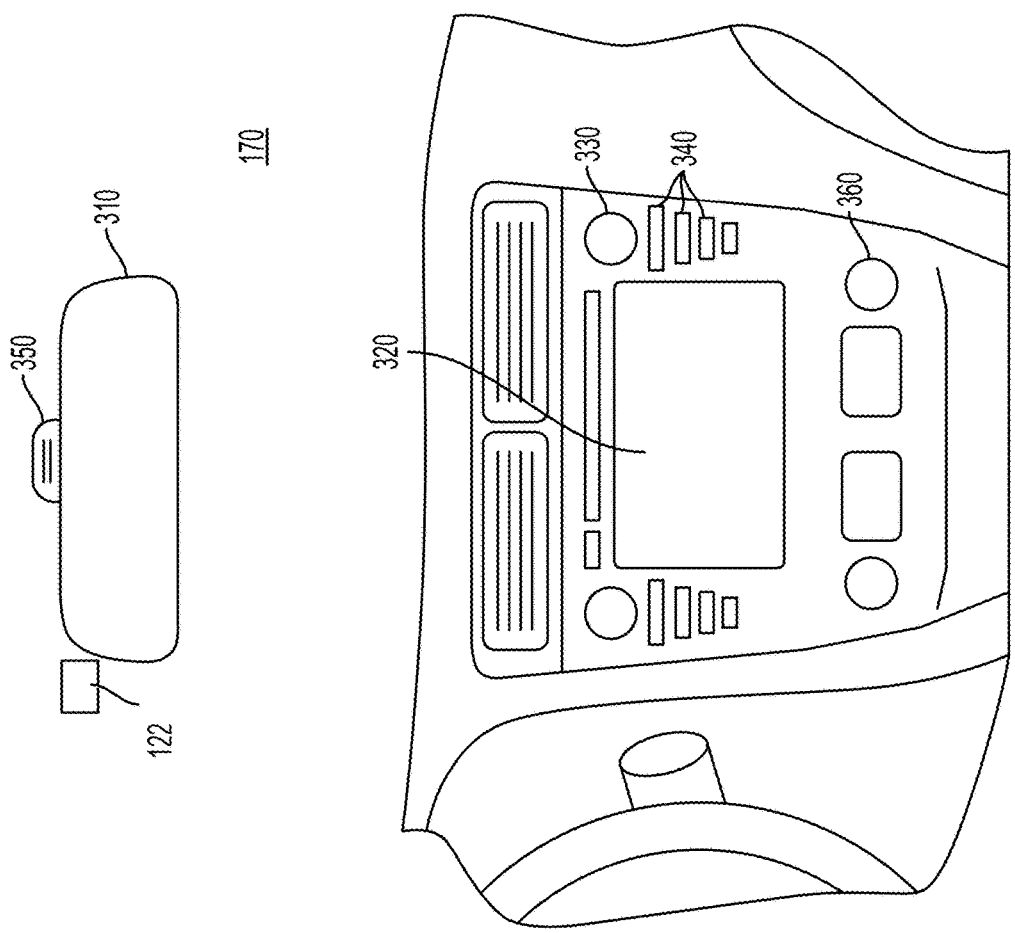
FIG. 3 is a diagrammatic representation of an interior of a vehicle including a rearview mirror and a user interface for a vehicle imaging system consistent with the disclosed embodiments.

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 1220, braking system 1230, and steering system 1240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

B. Preventing Overwriting of Shared Memory Line Segments

Lines of a shared memory may be shared between different units.

One type of sharing involves allocating different shared line segments to different units so that different unit may modify their allocated shared line segment without overwriting other shared line segment allocated to other units.

Dirty bits indicate which shared line segments can be written and which cannot be written by a certain unit.

When dirty bits are removed or do not reach a certain unit, then the unit may overwrite data segments not allocated to the unit.

The ARM Advanced Microcontroller Bus Architecture (AMBATM) is an open-standard, on-chip interconnect specification for the connection and management of functional blocks in system-on-a-chip (SoC) designs (see: www.wikipedia.org). It facilitates development of multiprocessor designs with large numbers of controllers and peripherals with a bus architecture. AMBA is a registered trademark of ARM Ltd of the United Kingdom.

AMBATM was introduced by ARM in 1996. In 2003, ARM introduced the third generation, AMBATM 3, including Advanced Extensible Interface (AXI) and the Advanced Trace Bus (ATB) as part of the CoreSight on-chip debug and trace solution. In 2011, ARM introduced AMBATM 4 which includes AXI coherency extension (ACE) protocol.

System on chips may include a variety of processing units, memory units, and other units that may exchange data in various manners—and using different protocols.

It has been found that dirty bits may be deleted in various scenarios that involve sending data units using different protocols—especially when a first processor modifies a data unit and a second processor (that shares the cache coherency domain with the first processor) requests to retrieve the data unit.

There is a growing need to provide a solution that will prevent overwriting of data units in a shared memory.

Figure 4A:
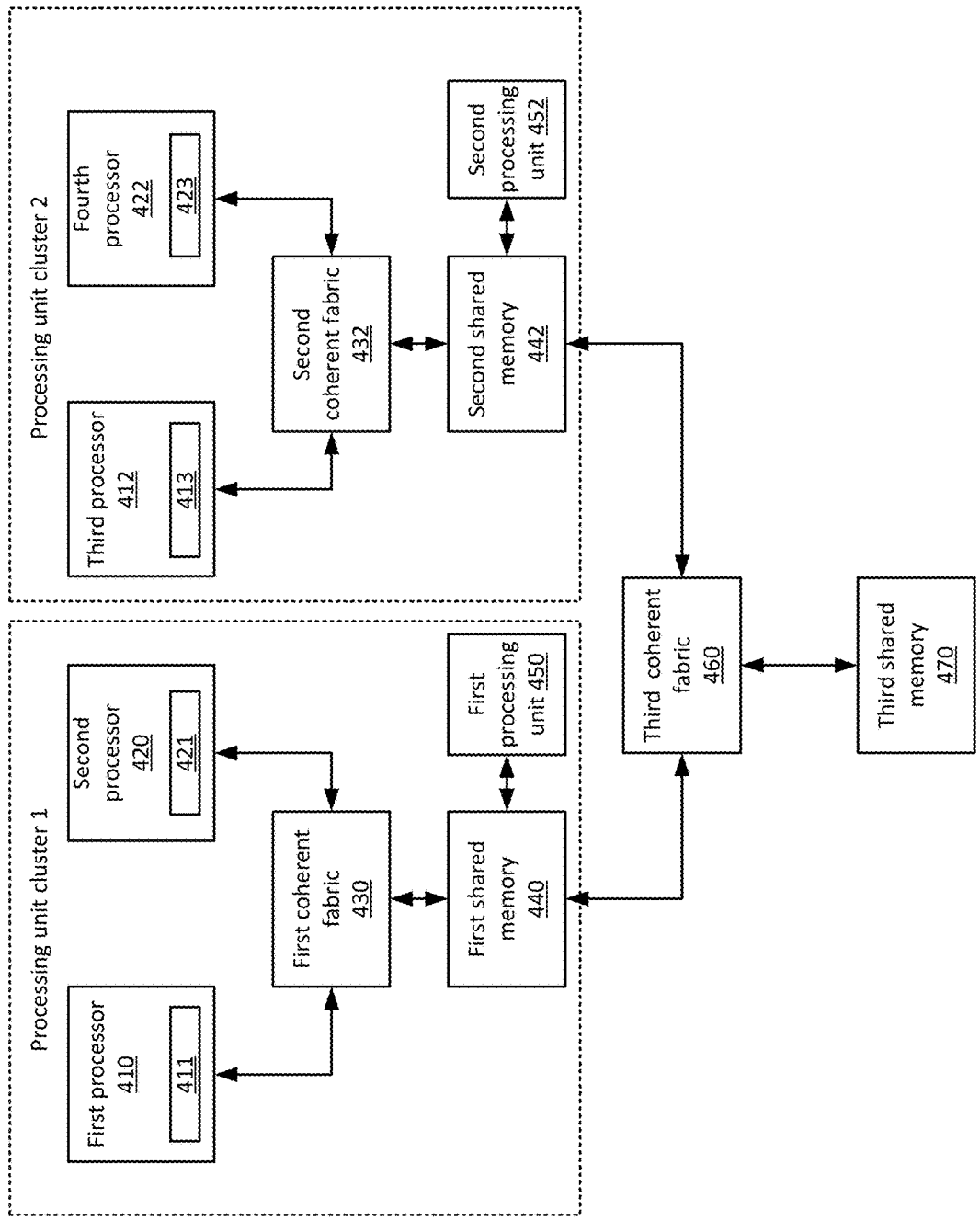
FIG. 4A illustrates an example of a part of device consistent with the disclosed embodiments.

FIG. 4A illustrates an example of a part 400 of a device. The part of the device may be included in an integrated circuit, may be included on more than a single integrated circuit, and the like. Part 400 may belong to processing unit 110 of previous drawings, for example.

FIG. 4A illustrates two clusters of processing units. The number of clusters may be one or may be or exceed two.

The clusters may simplify the maintaining of coherency by introducing a hierarchy—in which each cluster maintains its coherency, and additional measures are taken to maintain the coherency between clusters. This simplifies the maintenance of coherency—especially when there are many processing units that should access shared memories while maintaining coherency.

The first cluster includes first processor 410, second processor 420, first coherent fabric 430, first processing unit 450, and first shared memory 440. The first cluster may include additional processing units and/or additional interconnects or any other units.

The first processor 410 may include a first level-one cache 411. The second processor 420 may include a second level-one cache 421.

The first processor 410 and second processor 420 are within a first cache coherency domain.

The first coherent fabric 430 is located between (a) the first processor 410 and second processor 420, and (b) the first shared memory 440.

The first and second processors may communicate using an augmented hardware cache coherency protocol. The augmented hardware cache coherency protocol is augmented to maintain dirty bits information during an exchange of the data unit within the first cache coherency domain.

The first processing unit 450, the first coherent fabric 430, and the first shared memory 440 may communicate with each other using another protocol ("other" protocol), which differs from the augmented hardware cache coherency protocol, as it does not support hardware coherency and maintains the dirty bits information.

The second cluster includes third processor 412, fourth processor 422, second coherent fabric 432, second processing unit 452 and second shared memory 442. The second cluster may include additional processing units and/or additional interconnects or any other units.

The third processor 412 and fourth processor 422 are within a second cache coherency domain.

The third processor 412 may include a third level-one cache 413. The fourth processor 422 may include a fourth level-one cache 423.

The second coherent fabric 432 is located between (a) the third processor 412 and fourth processor 422, and (b) the second shared memory 442.

The third and fourth processors may communicate using an augmented hardware cache coherency protocol.

The second processing unit 452, the second coherent fabric 432, and the second shared memory 442 may communicate with each other using the other protocol.

The first and second shared memories 440 and 442 may be cache memories or may differ from a cache memory. The first and second shared memories may be the same memory unit.

First shared memory 440 and second shared memory 442 are coupled to third coherent fabric 460 that is also coupled to third shared memory 470.

Figure 4B:
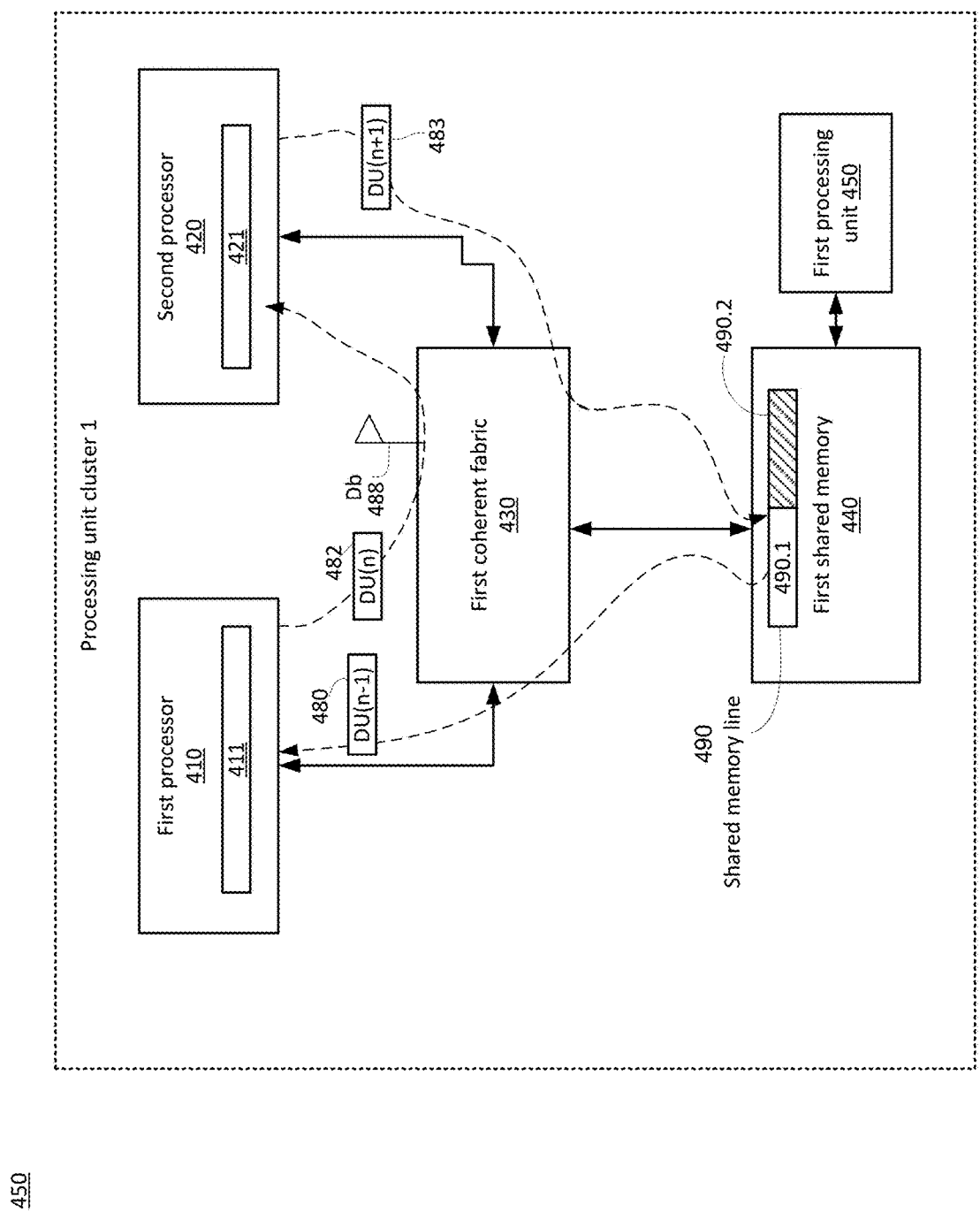
FIG. 4B illustrates an example of a part of a device consistent with the disclosed embodiments.

FIG. 4B illustrates part 450 and various steps executed by the part 450.

It is assumed that the first and second processors may update only a first segment 491 of a shared memory line 490—but are not allowed to update a second segment 492 of the shared memory line. The shared memory line may be of any size. For example, it may include two or more (for example—64) bytes.

The first segment 491 may be allocated to the first cluster, and the second segment 492 may be allocated to the second cluster.

The allocation may be fixed or may change over time. Different clusters may receive segments of the same size, whereas at least two clusters may be allocated with segments of different sizes.

The first processor, the second processor and any unit of part 450 may execute the following steps:

Retrieving, by first processor 410, from a first shared memory 440 (or from any other shared memory—including third shared memory 470), a previous version of a data unit DU(n−1) 480.

Modifying the previous version of the data unit, by the first processor, to provide data unit DU(n) 482. The data unit is smaller than the shared memory line and dirty bits indicative of the amended data unit are generated to indicate that the data unit was amended.

Requesting (for example—over the first coherent fabric 430 and by the second processor) the data unit. This is done before the data unit is written to a shared memory.

Sending (using the augmented hardware cache coherency protocol) the data unit DU(N) 482 with dirty bits db(n) 488 that indicate that only the data unit was amended. The first and second processors are allowed to update only the first segment 491—and not the second segment 492.

Modifying the data unit 482(n), by the second processor, to provide new data unit DU(n+1) 483 and updating the dirty bits to reflect the amendment.

Writing the new data unit to the first segment 491—without overwriting the second segment 492. Thus—the new data unit is written without modifying second segment 492.

It should be noted that the resolution of the dirty bits may be finer that the size of the data unit, and that a modification of a part of a data unit may be signaled by the dirty bits information. For example—each byte may have an allocated dirty bits and the data unit may be two or more bits long—thus allocating multiple dirty bits to a single data unit. Any reference to a modification of a data unit should be applied mutatis mutandis to the modification of a part of a data unit.

Figure 5A:
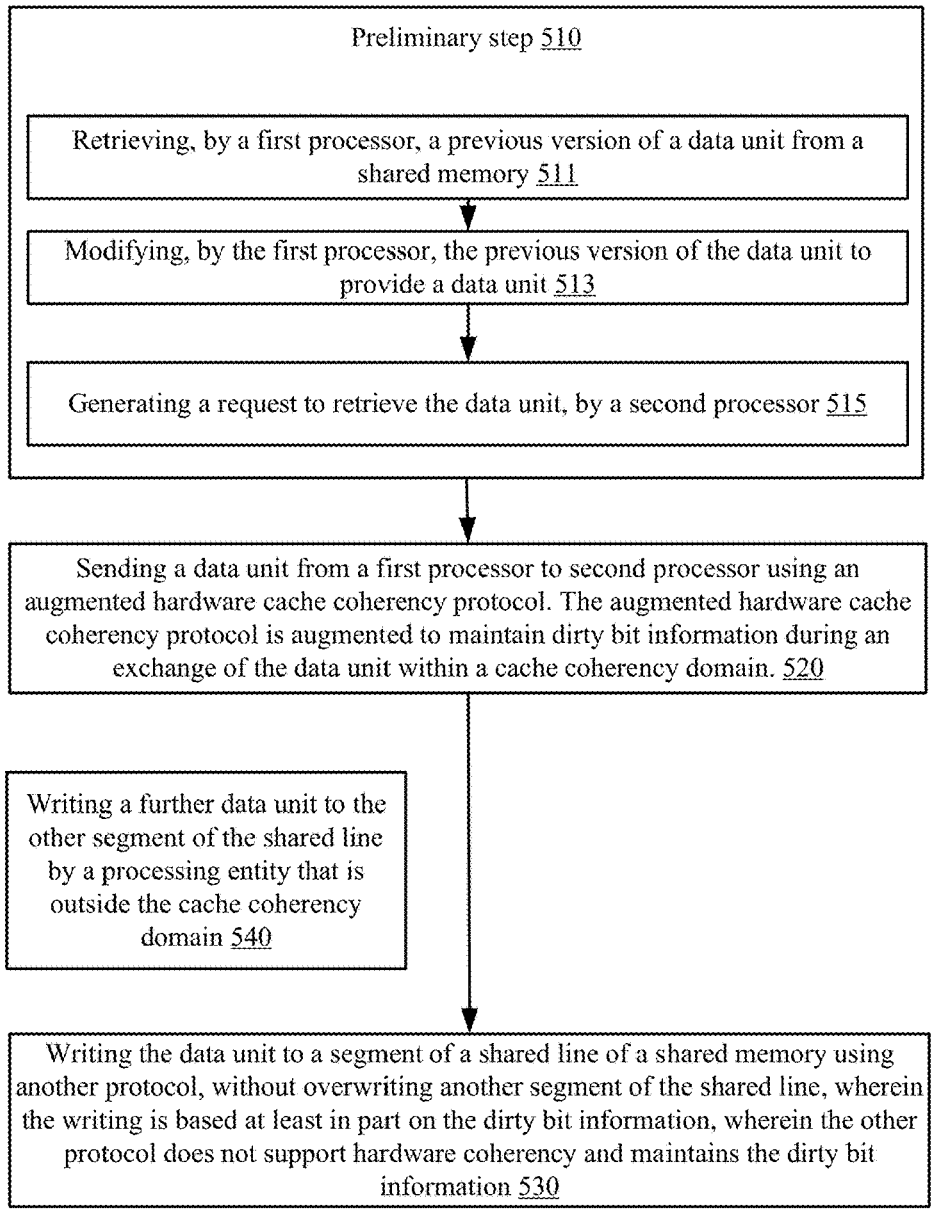
FIG. 5A illustrates an example of a method consistent with the disclosed embodiments.

FIG. 5A illustrates method 500 for preventing overwriting cached information.

Method 500 may include preliminary step 510.

Step 510 may include:

Step 511 of retrieving, by a first processor, a previous version of a data unit from a shared memory.

Step 513 of modifying, by the first processor, the previous version of the data unit to provide a data unit.

Step 515 of generating a request to retrieve the data unit, by a second processor.

Step 510 may be followed by step 520 of sending a data unit from a first processor to second processor using an augmented hardware cache coherency protocol. The augmented hardware cache coherency protocol is augmented to maintain dirty bits information during an exchange of the data unit within a cache coherency domain.

It should be noted that applying the hardware cache coherency (without the augmentation) may result in a loss of the dirty bits information—and having the second processor overwriting the entire share line when writing to the shared memory. Such an overwrite may delete content written to other segments of the shared line.

A size of the data unit is a fraction of a size of any shared line of a shared memory.

Step 520 may be executed before the first processor sends the data unit to the shared memory.

Step 520 may be followed by step 530 of writing the data unit to a segment of a shared line of a shared memory using another protocol, without overwriting another segment of the shared line, wherein the writing is based at least in part on the dirty bits information, and wherein the other protocol does not support hardware coherency and maintains the dirty bits information.

Method 500 may also include step 540 of writing a further data unit to the other segment of the shared line by a processing entity that is outside the cache coherency domain. Step 540 may be executed in parallel to either one of steps 510, 520, and 530.

The other protocol may be an advanced extensible interface (AXI) protocol, and the augmented hardware coherency protocol may be an augmented AXI coherency extension (ACE) protocol.

The ACE protocol may support various augmented coherency commands such as:

ReadShared—request to read a cache line (which the requesting master typically doesn't have) in any dirtiness/shared state.

ReadUnique—request to read a cache line (which the requesting master typically doesn't have) in a Unique state (i.e. that no other master has a copy of it). Typically because the master is intending to writing to it.

CleanUnique—request to change a cache line (which typically, the requesting master already has in shared state) to unique state. Typically because the master is intending to write to it.

Step 530 may include sending the data unit to a first coherent fabric and sending the data unit from the first coherent fabric to the segments of the shared line.

While steps 510, 520 and 530 are illustrated in relation to certain units, it should be noted that steps 510, 520 and 530 may be executed by other and/or additional units. For example, it may be executed for multiple clusters.

For example, method 500 may include (a) sending another data unit from a third processor to a fourth processor using the augmented hardware cache coherency protocol, wherein a size of the other data unit is a fraction of the size of any shared line of another shared memory; and (b) writing the other data unit to a segment of a shared line of the other shared memory using the other protocol, without overwriting another segment of the shared line, wherein the writing is based at least in part on the dirty bits information.

Section II

A. Additional Vehicle Systems and Operation Vehicle Systems and Operation

Examples are provided herein with respect to features of processing images of an environment ahead of a vehicle navigating a road for training a neural networks, deep learning algorithms to estimate a future path of a vehicle based on images, and features of the processing of images of an environment ahead of a vehicle navigating a road using a trained neural network to estimate a future path of the vehicle. Before disclosing the details of these example features, there is provided a description of various possible implementations and configurations of a vehicle mountable system that can be used for performing the embodiments of the presently disclosed subject matter. In some embodiments, various examples of the system can be mounted in a vehicle, and can be operated while the vehicle is in motion. In some embodiments, the system can implement the methods according to examples of the presently disclosed subject matter.

FIG. 1 illustrates an exemplary block diagram of a system, in accordance with one or more embodiments of the present disclosure. The system 100 as shown in FIG. 1 may include various components depending on the requirements of a particular implementation. In some examples, system 100 may include a processing unit 110, an image acquisition unit 120, and one or more memory units 140, 150.

Processing unit 110 may be alternatively referred to herein as processing circuitry, and may include one or more processors or processing devices, software components, or combinations of these. In some embodiments, the processing unit 110 may include an application processor 180, an image processor 190, or any other suitable processing device. Similarly, image acquisition unit 120 may be alternatively referred to herein as image acquisition circuitry, and may include one or more processors or processing devices, software components, or combinations of these. The image acquisition unit 120 may include any suitable number of processors or processing devices configured to perform image acquisition and/or components (which may include software-executable components) depending on the requirements of a particular application. In some embodiments, the image acquisition unit 120 may include one or more image capture devices (e.g., cameras), such as image capture device 122, image capture device 124, and image capture device 126.

In some embodiments, the system 100 may also include a data interface 128 that is configured as any suitable type of hardware components, software components, or combinations of these that is configured to communicatively connect the processing unit 110 to the image acquisition unit 120. For example, the data interface 128 can include any suitable number of wired and/or wireless links, buses, terminals, ports, links for transmitting image data acquired by image acquisition unit 120 to processing unit 110, etc.

Both the application processor 180 and the image processor 190 may be implemented as any suitable number and/or type of processing devices. For example, either or both of the application processor 180 and the image processor 190 may be implemented as one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, the application processor 180 and/or the image processor 190 may be implemented as any suitable type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, the application processor 180 and/or the image processor 190 may be implemented as any of the EyeQ series of processor chips available from Mobileye®. These processor designs may include multiple processing units with local memory and instruction sets. Such processors may include video inputs for receiving image data from multiple image sensors, and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP®, and the DMA, the second MIPS34K CPU and the multi-channel DMA, as well as the other peripherals. The five VCEs, three VMP®, and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in the processing unit 110, embodiments include the processing unit 110 being implemented with any suitable number of processors and/or processing devices. For example, in some examples, a single processing device may be used to accomplish the tasks of application processor 180 and image processor 190. As another example, in other embodiments these tasks can be performed by more than two processing devices.

The processing unit 110 may be implemented as any suitable type of device. For example, the processing unit 110 may be implemented as various devices such as a controller, an image preprocessor, a central processing unit (CPU), support circuits, digital signal processors, integrated circuits, memory, or any other suitable types of devices for image processing and analysis. The image preprocessor may include a video processor for capturing, digitizing, and processing the imagery from the image capture devices 122, 124, 126. The CPU may include any suitable number and/or type of microcontrollers or microprocessors. The support circuits may be any suitable number and/or type of circuits, including those that are known in the art, including cache, power supply, clock, and input-output circuits for instance.

The system 100 may include any suitable number of memory units, with two memory units 140, 150 being shown in FIG. 1 for purposes of brevity. The memory units 140, 150 may alternatively be referred to herein as a memory. The memory 140 and/or 150 may store software that, when executed by any suitable processor (such as one or more processors identified with the processing unit 110), controls the operation of the system 100. The memory 140 and/or 150 may include databases and/or image processing software, including a trained system such as a neural network, for example. The memory 140 and/or 150 may include any suitable number of random access memories, read only memories, flash memories, disk drives, optical storage, removable storage, and any other suitable types of storage. In one example, the memory 140 and/or 150 may be separate from the processing unit 110. In another example, the memory 140 and/or 150 may be integrated into the processing unit 110.

Each of the memory 140, 150 may include software instructions (i.e. computer-readable and executable instructions) that, when executed by a processor (e.g., application processor 180 and/or image processor 190), may control operation of various aspects of system 100. The memory units 140 and/or 150 may include various databases and image processing software. The memory units 140 and/or 150 may include random access memory, read only memory, flash memory, disk drives, optical storage, tape storage, removable storage, and/or any other suitable types of storage. In some examples, the memory units 140 and/or 150 are separate from the application processor 180 and/or image processor 190. In other embodiments, the memory units 140 and/or 150 may be integrated into the application processor 180 and/or the image processor 190.

In some embodiments, the system 100 may include a position sensor 130. The position sensor 130 may include any suitable type of device configured to determine a location associated with at least one component of the system 100. In some embodiments, the position sensor 130 may include a Global navigation satellite system (GNSS) receiver, such as a Global Positioning System (GPS) receiver for instance. Such receivers may determine a user's position and velocity by processing signals broadcasted by GNSS satellites. Position information from the position sensor 130 may be made available to the application processor 180 and/or the image processor 190.

In some embodiments, the system 100 may be operatively connectible to various systems, devices, and/or units onboard a vehicle in which the system 100 may be mounted. The various components of the system 100 may communicate with one another and/or the vehicle's various systems via any suitable number and/or type of interfaces (e.g., a communication bus). Examples of vehicle systems with which the system 100 may cooperate include a throttling system, a braking system, a steering system, etc.

In some embodiments, the system 100 may include a user interface 170. The user interface 170 may be implemented as any suitable type of device for providing information to one or more users and/or for receiving inputs from one or more users of the system 100. The user interface 170 may be implemented as, for instance, a touchscreen, microphone, keyboard, pointer device(s), track wheels, cameras, knobs, buttons, etc. Information may be provided by the system 100 to the one or more users of the system 100 via presentation through the user interface 170.

In some embodiments, the system 100 may include a map database 160. The map database 160 may be implemented as any suitable type of database for storing digital map data. In some examples, the map database 160 may include data relating to a position, in a reference coordinate system, of various items including roads, water features, geographic features, points of interest, etc. The map database 160 may store not only the locations of such items, but also descriptors relating to those items, including, for example, names associated with any of the stored features and other information about them. For example, locations and types of known obstacles may be included in the database, information about a topography of a road or a grade of certain points along a road, etc. In some embodiments, the map database 160 may be physically located with other components of system 100. Alternatively or additionally, the map database 160 or a portion thereof may be located remotely with respect to other components of system 100 (e.g. remote to the processing unit 110). In such embodiments, information from the map database 160 may be downloaded from a network over any suitable type of wired and/or wireless data connection and in accordance with any suitable number and/or type of communication protocols (e.g., over a cellular network and/or the Internet, etc.).

The image capture devices 122, 124, and 126 may each be implemented as any suitable type of device configured to capture at least one image from an environment. Moreover, any suitable number of the image capture devices 122, 124, and 126 may be implemented by the system 100 to acquire images that may then be input to the image processor 190. Some embodiments of the presently disclosed subject matter may be implemented with only a single-image capture device, while other embodiments may be implemented with two, three, or even four or more image capture devices. The image capture devices 122, 124, and 126 are further described below with reference to FIGS. 2B-2E.

The system 100 may implement or be work in conjunction with any suitable number and/or type of sensors, including for example: an acoustic sensor, a RF sensor (e.g., radar transceiver), a LIDAR sensor, etc. Such sensors may be used independently of or in cooperation with the image acquisition unit 120. For example, data from a radar system (not shown) may be used for validating processed information that is received from processing images acquired via the image acquisition unit 120, e.g. to filter certain false positives resulting from processing images acquired by the image acquisition unit 120. Alternatively, data from a radar system (not shown) may be combined with or otherwise compliment the image data from the image acquisition unit 120, or some processed variation or derivative of the image data from the image acquisition unit 120.

System 100, or various components thereof, can be incorporated into any suitable number and/or type of different platforms. In some embodiments, the system 100 may be implemented as part of a vehicle 200, as shown in FIG. 2A. For example, the vehicle 200 may be equipped with the processing unit 110 and any of the other components of system 100, as described above relative to FIG. 1. While in some embodiments the vehicle 200 may be equipped with only a single-image capture device (e.g., camera), in other embodiments, such as those discussed in connection with FIGS. 2B-2E, multiple image capture devices may be implemented. For example, either of the image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3, the image capture device 122 may be located in the vicinity of the rearview mirror. This position may provide a line of sight similar to that of the driver of vehicle 200, which may aid in determining what is and is not visible to the driver.

Other locations for the image capture devices of image acquisition unit 120 may also be used. For example, the image capture device 124 may be located on or in a bumper of vehicle 200. Such a location can be especially advantageous for image capture devices having a wide field of view. The line of sight of bumper-located image capture devices may be different from that of the driver. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, mounted in or near light figures on the front and/or back of vehicle 200, etc. The image capture unit 120, or an image capture device that is one of a plurality of image capture devices that are used in an image capture unit 120, may have a field-of-view (FOV) that is different than the FOV of a driver of a vehicle, and may not always see the same objects. In one example, the FOV of the image acquisition unit 120 may extend beyond the FOV of a typical driver and thus image objects which are outside the FOV of the driver. In yet another example, the FOV of the image acquisition unit 120 is some portion of the FOV of the driver. In some embodiments, the FOV of the image acquisition unit 120 corresponding to a sector that covers an area of a road ahead of a vehicle and possibly also surroundings of the road.

In addition to image capture devices, the vehicle 200 may be include any components of the system 100, although not every component of the system 100 is shown for purposes of brevity. For example, the processing unit 110 may be included on vehicle 200 either integrated with or separate from an engine control unit (ECU) of the vehicle. The vehicle 200 may also be equipped with a position sensor 130, such as a GNSS receiver, and may also include the map database 160 and the memory units 140 and 150.

FIG. 2A illustrates an exemplary representation of a vehicle including a system, in accordance with one or more embodiments of the present disclosure. FIG. 2B illustrates an exemplary representation of the vehicle and system shown in FIG. 2A, in accordance with one or more embodiments of the present disclosure. As illustrated in FIG. 2B, the disclosed examples may include a vehicle 200 including in its body the system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and the processing unit 110.

As illustrated in FIG. 2C, the image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

As shown in FIG. 2D, the image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200, and may be applicable to all types of vehicles including automobiles, trucks, trailers, motorcycles, bicycles, self-balancing transport devices and other suitable types of vehicles.

The first image capture device 122 may include any suitable type of image capture device. The image capture device 122 may include an optical axis. In one instance, the image capture device 122 can include an Aptina M9V024 Wide Video Graphics Array (WVGA) sensor with a global shutter. In another example, a rolling shutter sensor may be implemented. Image acquisition unit 120, and any image capture device which is implemented as part of the image acquisition unit 120, may have any suitable image resolution. For example, the image capture device 122 may provide a resolution of 1280×960 pixels and include a rolling shutter.

The image acquisition unit 120, and any image capture device which is implemented as part of the image acquisition unit 120, may include various optical elements. In some embodiments, one or more lenses may be included, for example, to provide a desired focal length and field of view for the image acquisition unit 120, and for any image capture device which is implemented as part of the image acquisition unit 120. In some examples, an image capture device which is implemented as part of the image acquisition unit 120 may include or be associated with any optical elements, such as a 6 mm lens or a 12 mm lens, for example. In some examples, the image capture device 122 may be configured to capture images having a desired (and predetermined) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

FIG. 2E illustrates an exemplary representation of a vehicle control system, in accordance with one or more embodiments of the present disclosure. As indicated in FIG. 2E, the vehicle 200 may include a throttling system 220, a braking system 230, and a steering system 240. The system 100 may provide inputs (e.g., control signals) to one or more of the throttling system 220, the braking system 230, and/or the steering system 240 over one or more data links (e.g., any wired and/or wireless link or links for transmitting data). For example, based on an analysis of images acquired by image capture devices 122, 124, and/or 126, the system 100 may provide control signals to one or more of throttling system 220, the braking system 230, and/or the steering system 240 to navigate the vehicle 200 (e.g., by causing an acceleration, a turn, a lane shift, etc.). Further, the system 100 may receive inputs from one or more of throttling system 220, the braking system 230, and/or the steering system 240 indicating operating conditions of the vehicle 200 (e.g. speed, whether the vehicle 200 is braking and/or turning, etc.).

FIG. 3 illustrates an exemplary representation of an interior of a vehicle including a rearview mirror and a user interface for a vehicle imaging system, in accordance with one or more embodiments of the present disclosure. As shown in FIG. 3, the vehicle 200 may also include the user interface 170 for interacting with a driver or a passenger of vehicle 200. For example, the user interface 170 in a vehicle application may include a touch screen 320, knobs 330, buttons 340, and a microphone 350. A driver or passenger of the vehicle 200 may also user handles (e.g., located on or near the steering column of vehicle 200 including, for example, turn signal handles), buttons (e.g., located on the steering wheel of vehicle 200), and the like, to interact with the system 100. In some embodiments, the microphone 350 may be positioned adjacent to a rearview mirror 310. Similarly, in some embodiments, the image capture device 122 may be located near the rearview mirror 310. In some embodiments, the user interface 170 may also include one or more speakers 360 (e.g., speakers of a vehicle audio system). For example, the system 100 may provide various notifications (e.g., alerts) via the speakers 360.

Numerous variations and/or modifications may be made to the foregoing disclosed embodiments. For example, not all components are essential for the operation of the system 100. Further, any component may be located in any appropriate part of the system 100, and the components may be rearranged into a variety of configurations while providing the functionality of the disclosed embodiments. Therefore, the foregoing configurations are examples and, regardless of the configurations discussed above, the system 100 may provide a wide range of functionality to analyze the surroundings of the vehicle 200 and, in response to this analysis, navigate and/or otherwise control and/or operate the vehicle 200. The navigation, control, and/or operation of the vehicle 200 may include enabling and/or disabling (directly or via intermediary controllers, such as the controllers mentioned above) various features, components, devices, modes, systems, and/or subsystems associated with the vehicle 200. The navigation, control, and/or operation may alternately or additionally include interaction with a user, driver, passenger, passerby, and/or other vehicle or user, which may be located inside or outside the vehicle 200, for example by providing visual, audio, haptic, and/or other sensory alerts and/or indications.

As discussed below in further detail and consistent with various disclosed embodiments, the system 100 may provide a variety of features related to autonomous driving, semi-autonomous driving, and/or driver assist technology. For example, the system 100 may analyze image data, position data (e.g., GNSS location information), map data, speed data, and/or data from sensors included in the vehicle 200. The system 100 may collect the data for analysis from, for example, the image acquisition unit 120, the position sensor 130, and/or other sensors. Further, the system 100 may analyze the collected data to determine whether or not the vehicle 200 should take a certain action, and then automatically take the determined action without human intervention. It would be appreciated that in some cases, the actions taken automatically by the vehicle 200 are under human supervision, and the ability of the human to intervene adjust abort or override the machine action is enabled under certain circumstances or at all times. For example, when the vehicle 200 navigates without human intervention, the system 100 may automatically control the braking, acceleration, and/or steering of vehicle 200 (e.g., by sending control signals to one or more of throttling system 220, the braking system 230, and/or the steering system 240). Further, the system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are enabled via the system 100 are provided below.

B. Additional Prevention of Overwriting of Shared Memory Line Segments

FIG. 4A illustrates an example of device components, in accordance with one or more embodiments of the present disclosure. The device 400 as shown in FIG. 4A includes various components, which may be implemented as part of an SoC, an integrated circuit (IC), as components distributed over several SoCs or ICs, etc. The device 400 may be identified, for instance, with a processing unit such as the processing unit 110 as discussed above in Section I. The various components of the device 400 as discussed herein may be implemented in accordance with the architecture and application of the device 400. As one example, if the device 400 forms the entirety or portion of an SoC, then the various components as shown in FIG. 4A as discussed herein may be implemented as functional units (e.g. functional components) of the SoC.

The processing entities (e.g. the processors and processing units such as the first, second, third, and fourth processors 410, 420, 412, 422, as well as the first and second processing units 450, 452) may be implemented as any suitable number and/or type of processors, processing circuitry, hardware, software, of combinations of these. For example, the processing entities may be implemented as processor cores such as a microcontroller, microprocessor (μP), digital signal processor (DSP), application-specific instruction set processor (ASIP) core, etc. As another example, one or more of the processing entities may be implemented as hardware accelerators, which may include, for example, image processors, Neural Network processors, or any other suitable type of hardware accelerator. For ease of explanation, the processing entities (e.g. the processors and processing units such as the first, second, third, and fourth processors 410, 420, 412, 422, as well as the first and second processing units 450, 452) may be different types of processors, the same type of processors, or constitute shared components of the same processing entities. The different terms "processors" versus "processing units" have been introduced to clarify that the processors 410, 420, 412, and 422 communicate using a respective coherent fabric, whereas the processing units 450, 452, etc. need not communicate via the coherent fabrics as noted herein, and may instead read and/or write data to their respective shared memories 440, 442 directly.

The first, second, and third shared memory 440, 442, 470 may be implemented as any suitable type of memory that is shared among (i.e. read and written to) the various processing entities of the device 400 as discussed herein. For example, the first, second, and third shared memory 440, 442, 470 may be implemented as semiconductor memory blocks, read-only memory (ROM), random-access memory (RAM), Electrically Erasable Programmable ROM (EEPROM) memory, flash memory, etc.

The device 400 is shown in FIG. 4A as implementing two processing unit "clusters" by way of example and not limitation. The device 400 may implement any suitable number of processing unit clusters depending upon the particular implementation and application. In an embodiment, the architecture of the device 400 and the use of processing unit clusters as discussed herein may simplify the maintenance of coherency. Coherency in this context refers to an issue that is of particular concern when multiple processors share a memory, and which may periodically read and write to the same location in the shared memory. Data coherency thus refers to the value presently stored at a particular shared memory address location consistently being the last value written to that shared memory address location by any of the processors that are able to read and write data to the shared memory.

The embodiments described herein address issues related to data coherency with respect to the use of a shared memory by multiple processing entities. To do so, the embodiments as discussed herein introduce a hierarchy, with each processing unit cluster maintaining its respective data coherency, and additional measures being taken to maintain the data coherency between processing unit clusters. Doing so simplifies the maintenance of data coherency, particularly when there are many processing units that access shared memories.

With continued reference to FIG. 4A, the device 400 includes a first processing unit cluster (processing unit cluster 1), which comprises a first processor 410, a second processor 420, a first coherent fabric 430, a first processing unit 450, and a first shared memory 440. The first processing unit cluster may include additional processing entities (e.g. additional processors, processing units, etc.), interconnects, coherent fabrics, shared memories, and/or any suitable number of other components. The arrows as shown in FIG. 4A may represent interconnections between the various components, and thus may be implemented as any suitable type of wired or wireless links, traces, connections, buses, etc. The various processors, processing units, etc. may read data from and write data to the shared memories as discussed herein. In embodiments in which the device 400 is implemented as an SoC, the arrows between each of the components as shown in FIG. 4A may represent intermodule communications between these components.

The first processor 410 may include a first level-one cache 411, and the second processor 420 may include a second level-one cache 421. The first processor 410 and second processor 420 operate within a first cache coherency domain. The first and second level-one caches 411, 421 may represent memory of any suitable type and/or size configured as cache memory.

The first processing unit cluster also implements a first coherent fabric 430, which is located between (a) the first processor 410 and the second processor 420, and (b) the first shared memory 440. The first coherent fabric 430 may thus be configured to function as any suitable type of interconnect fabric that facilitates the first processor 410 and the second processor 420 writing data to and/or reading data from the shared memory 440. That is, the first coherency fabric 430 may function as an interconnection to pass data to and from the first and second processors 410, 420 and the first shared memory 440, as further discussed herein. The first coherent fabric 430 may thus be implemented as any suitable type of interconnect fabric based upon the particular architecture and implementation of the device 400. As one example, if the device 400 forms the entirety or portion of an SoC, then the first coherent fabric 430 may be implemented as an on-chip interconnect fabric.

The first processor 410 and the second processor 420 may each communicate with one another, via the use of the first coherent fabric 430, using any suitable type of hardware cache coherency protocol. In an embodiment, the first processor 410 and the second processor 420 may each communicate with one another using an augmented hardware cache coherency protocol. The augmented hardware cache coherency protocol may be implemented as a hardware cache coherency protocol that is augmented to maintain dirty bits information (e.g. keep or save the information that is embedded in the dirty bits) during an exchange of a data unit within the first cache coherency domain. Dirty bits as discussed herein are understood to be set when a particular processing entity writes to (i.e. modifies) the contents of a memory (e.g. a cache 411, 421, 413, 423, the shared memory 440, 442, etc.). The dirty bits thus indicate that its associated block of memory has been modified and has not yet been saved to a suitable storage device (e.g. the first shared memory 440, the second shared memory 442, etc.).

Again, memory sharing between two processors involves allocating different shared memory line segments to different processors so that different processors may modify their allocated shared memory line segments without overwriting the other shared memory line segments, which are allocated to other processors. This is typically achieved via the use of "dirty bits," which are part of various communication protocols as discussed herein. Dirty bits function to indicate which bits are changed for a particular data unit, and also indicate which shared memory line segments can and cannot be written to by specific processing entities (e.g. the first, second, third, and fourth processors 410, 420, 412, 422) as further discussed herein. The augmented hardware cache coherency protocol thus functions to maintain the dirty bits information when a data unit is transferred within the first cache coherency domain (e.g. a data unit read transferred from the first shared memory 440 to the first level-one cache 411 or the first level-one cache 421).

The first processing unit 450, the first coherent fabric 430, and the first shared memory 440 may communicate with each other using another communication protocol (i.e. the "other" communication protocol as discussed herein), which differs from the augmented hardware cache coherency protocol. In particular, the other communication protocol used to enable communications between the first processing unit 450, the first shared memory 440, and the first coherent fabric 430 may not support hardware coherency but still maintain the dirty bits information. Thus, the first and second processors 410, 420 may communicate with one another via the first coherent fabric 430 using the augmented hardware cache coherency protocol (i.e. a first communication protocol), whereas the first and second processors 410, 420 may read data units from and write data units to the first shared memory 440 via communication with the first coherent fabric 430, which implements the other (i.e. a second communication protocol) for this purpose.

In an embodiment, the other protocol may be implemented as an advanced extensible interface (AXI) protocol, and the augmented hardware coherency protocol may be implemented as an augmented AXI coherency extension (ACE) protocol. The ACE protocol may support various augmented coherency commands such as:

ReadShared—request to read a cache line (which the requesting primary processing entity typically does not have) in any dirtiness/shared state.

ReadUnique—request to read a cache line (which the requesting primary processing entity typically does not have) in a unique state (i.e. that no other primary processing entity has a copy of it). This is generally the case because the primary processing entity is intending to writing to the cache line.

CleanUnique—request to change a cache line (which generally the requesting primary processing entity already has in the shared state) to a unique state. This is typically performed because the primary processing entity is intending to write to the cache line.

It is noted that the above-commands are examples of those for the example protocols provided, and are not dependent upon the specific system as shown in the Figures.

The second processing unit cluster (processing unit cluster 2) includes a third processor 412, a fourth processor 422, a second coherent fabric 432, a second processing unit 452 and a second shared memory 442. As noted for the first processing unit cluster, the second processing unit cluster may also include additional processing entities (e.g. additional processors, processing units, etc.), interconnects, coherent fabrics, shared memory, and/or any suitable number of other components. The third processor 412, fourth processor 422, second coherent fabric 432, second processing unit 452, and second shared memory 442 included in the second processing unit cluster may operate in a substantially similar or identical manner and be implemented as the same type of components as the first processor 410, second processor 420, first coherent fabric 430, first processing unit 450, and first shared memory 440, respectively, of the first processing unit cluster as noted above. Thus, further details regarding the components of the second processing unit cluster are not provided herein for purposes of brevity.

The third processor 412 may include a third level-one cache 413. The fourth processor 422 may include a fourth level-one cache 423. The third processor 412 and fourth processor 422 are configured to operate within a second cache coherency domain. The second coherent fabric 432 is located between (a) the third processor 412 and the fourth processor 422, and (b) the second shared memory 442. The third and fourth level-one caches 411, 413, 423 may represent memory of any suitable type and/or size configured as cache memory.

The third processor 412 and the fourth processor 422 may each communicate with one another, via the use of the second coherent fabric 432, using any suitable type of hardware cache coherency protocol. In an embodiment, the third processor 412 and the fourth processor 422 may each communicate with the second coherent fabric 432 and the second shared memory 442 using an augmented hardware cache coherency protocol. The augmented hardware cache coherency protocol may be implemented as a hardware cache coherency protocol that is augmented to maintain dirty bits information during an exchange of a data unit within the second cache coherency domain.

The second processing unit 452, the second coherent fabric 432, and the second shared memory 442 may communicate with each other using the second communication protocol as described above with respect to the first processing unit cluster. Thus, the third and fourth processors 412, 422 may communicate with one another via the second coherent fabric 432 using the augmented hardware cache coherency protocol (i.e. a first communication protocol), whereas the third and fourth processors 412, 422 may read data units from and write data units to the second shared memory 442 via communication with the second coherent fabric 432, which implements the other (i.e. the second communication protocol) for this purpose.

As shown in FIG. 4A, the first shared memory 440 and the second shared memory 442 are each coupled to a third coherent fabric 460, which is also coupled to the third shared memory 470. The first, second, and third shared memories 440, 442, 470 may be any suitable type of memories, such as cache memories or non-cache memory. Although denoted as separate shared memories in the Figures, this is for ease of explanation, and any combination of the first, second, and third shared memories 440, 442, 470 may form part of the same shared memory unit.

FIG. 4B illustrates an example process flow of the device components as shown in FIG. 4A, in accordance with one or more embodiments of the present disclosure. Specifically, FIG. 4B illustrates additional details with respect to the operation of the first processing unit cluster as shown in FIG. 4A.

In the process flow 450 as shown in FIG. 4B, it is assumed that the dirty bits configuration is such that the first and second processors 410, 421 may update a first shared memory line segment 490.1 of a shared memory line 490, but are not allowed to update a second shared memory line segment 490.2 of the same shared memory line 490. The shared memory line 490 may be of any suitable size, which may correspond to a particular address range within the first shared memory 440. For example, the shared memory line 490 may represent storage of two or more bytes (e.g. 32 bytes, 64 bytes, etc.). The shared memory line 490 may represent a range of addresses associated with any suitable number of shared memories (the first shared memory 440 in this example) and is illustrated in detail for purposes of brevity, although the embodiments as discussed herein may be applied to any suitable number of shared memory lines within the first shared memory 440. Of course, the size of the shared memory line 490, as well as the size of the first shared memory 440, may vary depending upon how the first shared memory 440 is formatted, the particular application, required memory specifications, etc.

The shared memory line 490 may be from among any suitable number of shared memory lines identified with the first shared memory 440, and the size of one or more of these shared memory lines and/or shared memory line segments (including the shared memory line 490 and/or the shared memory line segment 490.1) may be proportionally related to a size of the data unit as discussed herein. As an example, the data unit as noted with respect of FIGS. 4A-4B may be a fraction or some smaller proportion of (e.g. $\frac{1}{64}$, $\frac{1}{32}$, $\frac{1}{16}$, $\frac{1}{8}$, $\frac{1}{4}$, etc.) of the size of any shared memory line and/or the shared memory line segment (e.g. the shared memory line 490 and/or the shared memory line segment 490.1) of the first shared memory 440. This may also be the case for any suitable number of the processing unit clusters as discussed herein. For instance, the data units of the second processing unit cluster may likewise be a fraction of the shared memory line 490 and/or the shared memory line segment 490.2. Additionally or alternatively, the data units of any one of the processing unit clusters of the device 400 as discussed herein may likewise be a fraction of a shared memory line and/or shared memory line segment identified with the second shared memory 442, as well as any other suitable shared memories.

In an embodiment, the first shared memory line segment 490.1 may be allocated to the first processing unit cluster, and the second shared memory line segment 490.2 may be allocated to the second processing unit cluster as shown in FIG. 4A. The allocation of the first and second shared memory line segments 490.1, 490.2 may be represented by specific address ranges identified with the shared memory line 490 that are allocated to the first and the second processing unit clusters and are identified via the use of the dirty bits information as discussed herein. Thus, the allocation of the first and the second shared memory line segments 490.1, 490.2 may be fixed or be dynamically changed/updated in terms of size (e.g. address ranges) and/or to which of the first and second processing unit cluster the first and second segments 490.1, 490.2 are allocated. Furthermore, the first and second processing unit clusters may be allocated shared memory line segments 490.1, 490.2 of the same size or different sizes. The manner in which each of the shared memory line segments of the first shared memory 440 are allocated among the first and second processing unit clusters in this way may also vary among each of the shared memory lines (e.g. the size of the respective shared memory line segments per each shared memory line may differ or remain the same for each of the shared memory lines identified with the first shared memory 440).

In an embodiment, the first processor 410 may retrieve, from the first shared memory 440 (or from any other shared memory—including the third shared memory 470), a previous version of a data unit DU(n−1) 480. The data unit 480 may be retrieved from the first shared memory line segment 490.1 of the shared memory line 490, as discussed above. The first processor 410 may then store the data unit 480 retrieved in this manner in the first level-one cache 411. The first processor 410 may then modify the previous version of the data unit 480 to provide an updated data unit DU(n) 482. The data units 480, 482 are each smaller than the overall size of the shared memory line 490. The dirty bits 488, which are indicative of the changes to the data unit 480 to generate the updated data unit 482, are generated as a result of the implementation of the augmented hardware cache coherency protocol that is used by the first processor 410, the second processor 420, and the first coherent fabric 430 as discussed herein. The dirty bits 488 thus indicate that the data unit 480 was updated/amended to the data unit 482.

Continuing this illustrative example, the second processor 420 may then request (e.g. via the first coherent fabric 430) the data unit 482, which is done before the data unit 482 is written to the shared memory 440 (or to any other shared memory—including the third shared memory 470).

In response to this request, the first processor 410 may then transmit (e.g. using the augmented hardware cache coherency protocol) the updated data unit 482 and dirty bits 488 that indicate that the data unit 482 was previously updated/amended. Continuing this example, the second processor 420 may then modify the data unit 482 to provide another updated/amended data unit DU(n+1) 483, and update the corresponding dirty bits 488 to reflect this amendment. This may occur, for instance, via the second processor 420 storing the data unit 482 to the second level-one cache 421 and then performing one or more processing operations that update or amend the value of the data unit 482 to generate the data unit 483.

The second processor 420 may then write the newly updated data unit 483 to the first shared memory 440 via the first coherent fabric 130 as discussed herein. In particular, the second processor 420 may transmit the data unit 483 to the first coherent fabric 430 using the first communication protocol, and the first coherent fabric 430 may in turn transmit (i.e. write) the updated data unit 483 to the first shared memory line segment 490.1 of the shared memory line 490 using the second communication protocol that maintains the dirty bits information (but does not support hardware coherency) without overwriting the data in the second shared memory line segment 490.2. In this way, the most-recently updated data unit 483 is written to the first shared memory line segment 490.1 of the shared memory line 490 without modifying data stored in the second shared memory line segment 490.2. Thus, because of the allocation of the shared memory line 490 as noted herein, the first and second processors 410, 420 are allowed to update only the first shared memory line segment 490.1 of the shared memory line 490, but may not update the second shared memory line segment 490.2 of the shared memory line 490.

Moreover, embodiments include the resolution of the dirty bits 488 being finer than the overall size of the data units 480, 482, 483. Thus, a modification of any suitable portion of a data unit may be indicated via the dirty bits information. For example, each byte or other suitable portion of the data units 480, 482, 483 may be two or more bits in length, and each bit identified with each byte or portion of the data unit, as the case may be, may be allocated to any suitable number of dirty bits from among the dirty bits 488 in accordance with a predetermined scheme or protocol. Thus, the dirty bits 488 may comprise multiple bits that are allocated to a single data unit. Thus, as discussed herein, any reference to a modification (i.e. amending or updating) a data unit may include the modification of the entirety of a data unit or, alternatively, any portion thereof (e.g. any number of bits, bytes, or portions thereof) a data unit, as the case may be.

It is noted that applying the hardware cache coherency protocol without the augmentation may result in a loss of the dirty bits information. As a result, in such a case the second processor 420 may overwrite the entire shared memory line 490 when writing to the first shared memory 440. Such overwriting may delete content written to other segments of the shared memory line 490. Thus, the use of the augmented hardware cache coherency protocol by the first and the second processors 410, 420 to communicate with one another, and the sue of the other communication protocol to write data units to the first shared memory via the first coherent fabric 430 (which maintains dirty bits information as well), ensures that the dirty bits information is retained, and also ensures that the contents of memory stored in the second shared memory line segment 490.2 is not modified as part of this process.

Figure 5B:
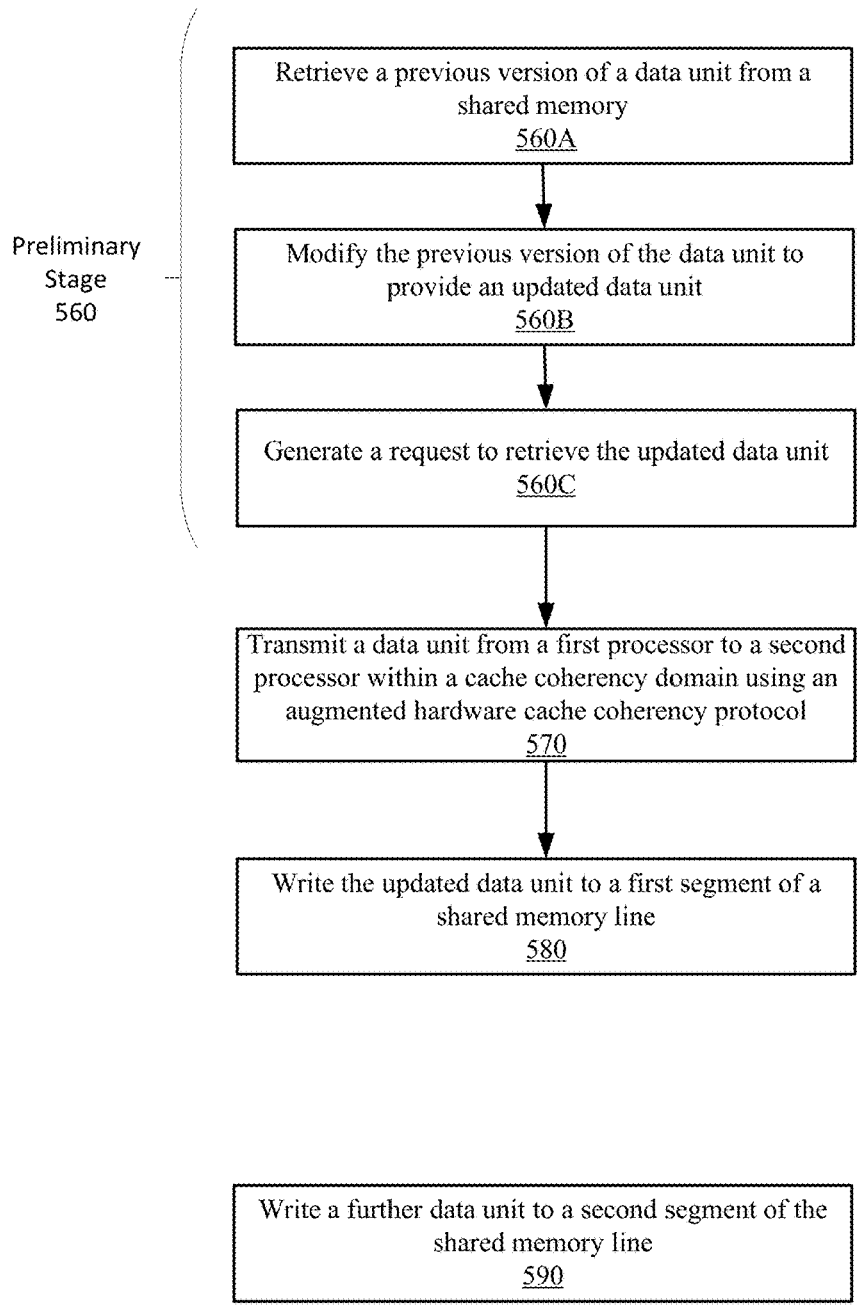
FIG. 5B illustrates an example of a method consistent with the disclosed embodiments.

FIG. 5B illustrates an example process flow, in accordance with one or more embodiments of the present disclosure. With reference to FIG. 5B, the flow 550 may be a computer-implemented method executed by and/or otherwise associated with one or more processors (processing circuitry) and/or storage devices. These processors and/or storage devices may be associated with one or more computing components identified with any suitable device, such as an SoC, an IC, the processing unit 110, the various processing entities identified with the device 400 as discussed herein, etc.

The processors as discussed herein may execute instructions stored on other computer-readable storage mediums such as the memories 140, 150 or, alternatively, stored on memories not shown in the Figures (which may be locally-stored instructions and/or as part of the processing circuitries themselves). The flow 550 may include alternate or additional steps that are not shown in FIG. 5B for purposes of brevity, and may be performed in a different order than the steps shown in FIG. 5B.

The process flow 550 may include a preliminary stage 560 as shown in FIG. 5B. The preliminary stage 560 may include retrieving (block 560A) a previous version of a data unit from a shared memory. This may include, for instance, the first processor 410 retrieving the data unit 480 from the first shared memory line segment 490.1 of the shared memory line 490 identified with the first shared memory 440, as discussed above with respect to FIG. 4B.

The process flow 550 may further include, as part of the preliminary stage 560, modifying (block 560B) the previous version of the data unit to provide an updated data unit. This may include, for instance, the first processor 410 modifying the data unit 480 to provide the updated data unit 482, as shown and discussed above with reference to FIG. 4B.

The process flow 550 may further include, as part of the preliminary stage 560, generating (block 560C) a request to retrieve the data unit. This may include, for instance, a request that is generated via the second processor 420 for the data unit 482 as discussed above with reference to FIG. 4B. This request may be performed before the data unit 482 is written to the shared memory 440 (or to any other shared memory—including third shared memory 470).

The process flow 550 may further include transmitting (block 570) a data unit from a first processor to second processor using an augmented hardware cache coherency protocol. The augmented hardware cache coherency protocol may represent a hardware cache coherency protocol that is augmented to maintain dirty bits information during an exchange of the data unit within a cache coherency domain that includes the first and the second processors. This may include, for instance, the first processor 410 transmitting the data unit 482 to the second processor 420, as discussed herein with reference to FIG. 4B. The data transmission (block 570) of the data unit 482 may occur prior to the first processor 410 sending (i.e. transmitting) the data unit 482 to the first shared memory 440 via the first coherent fabric 430, as noted above with reference to FIG. 4B.

The process flow 550 may further include writing (block 580) the data unit to a first shared memory line segment of a shared memory line of a shared memory using other, or second, communication protocol. Again, the second communication protocol enables the maintenance of the dirty bits information as noted herein, but does not support hardware coherency. This may include, for instance, the second processor 420 writing the updated data unit 483 to the first shared memory 440 via the first coherent fabric 430 as discussed herein with reference to FIG. 4B. Thus, and because the dirty bits are maintained via the use of the second communication protocol, the updated data unit 483 may be written to the first shared memory line segment 490.1 without overwriting data contained in the second shared memory line segment 490.2 of the shared memory line 490, as noted above with reference to FIG. 4B. In other words, the transmission of the updated data unit (block 570) may be implemented as the transmission of the updated data unit by the second processor 420 to the first coherent fabric 430, and the updated data unit may then transmitted from the first coherent fabric 430 to the particular segments of the shared memory line (segment 490.1 in this example).

Again, the first shared memory 440 may be shared among the first and the second processing unit clusters as noted above and shown in FIG. 4A. The different segments of the shared memory lines may be allocated to the different processing entities of the processing unit clusters. Thus, embodiments include the process flow 550 further including writing (block 590) a further data unit to another segment of the shared memory line. This process (block 590) may be performed in a similar manner as the process discussed herein with respect to the processing unit cluster 1, but be performed by the processing unit cluster 2 for instance.

For example, this may be performed by a processing entity that is outside of the first cache domain, such as one of the processors or processing units identified with the second processing unit cluster as shown and discussed herein with reference to FIG. 4A. The further data unit may be written, for example, to the second shared memory line segment 490.2 that is identified with the second processing unit cluster as noted above. The further data unit may be written (block 580) in this manner independently of the other functions of the process flow 550. For instance, the further data unit may be written (block 580) to any other allocated segment of the shared memory line of the first shared memory 440 in parallel with any of the other processes described with respect to the process flow 550.

As an illustrative example, the process flow 550 may include (a) transmitting a second data unit from the third processor 412 to the fourth processor 422 using the augmented hardware cache coherency protocol, and (b) writing the second data unit to the second segment 490.2 of the shared memory line 490 of the second shared memory 442 using the other protocol, without overwriting another segment of the shared line, as discussed above with respect to FIG. 4B.

It is further noted that while the various processes described with respect to the process flow 550 are described with respect to specific processors, processing units, or components, the process flow 550 may be executed by additional or alternate processing entities or other suitable components. For example, the process flow 550 may be executed for any suitable number of multiple processing unit clusters in parallel or independently of one another.

EXAMPLES

The following examples pertain to further aspects

An example (e.g. example 1) is a method for preventing overwriting of shared line segments of a shared memory, the method comprising: sending a data unit from a first processor to second processor using a first protocol that comprises an augmented hardware cache coherency protocol, the augmented hardware cache coherency protocol maintaining dirty bits information during an exchange of the data unit within a cache coherency domain, and a size of the data unit being a fraction of a size of the shared line segments of the shared memory; and writing the data unit to a shared line segment of the shared memory using a second protocol that is different than the augmented hardware cache coherency protocol without overwriting another shared line segment of the shared line, the writing being based at least in part on the dirty bits information, and wherein the second protocol does not support hardware coherency and maintains the dirty bits information.

Another example (e.g. example 2) relates to a previously-described example (e.g. example 1), further comprising: writing, via a processing entity that is outside the cache coherency domain, a further data unit to the other shared line segment of the shared line.

Another example (e.g. example 3) relates to a previously-described example (e.g. one or more of examples 1-2), wherein the processing entity is a hardware accelerator.

Another example (e.g. example 4) relates to a previously-described example (e.g. one or more of examples 1-3), wherein the second protocol comprises an advanced extensible interface (AXI) protocol, and wherein the first protocol comprises an augmented hardware coherency protocol that is an AXI coherency extension (ACE) protocol.

Another example (e.g. example 5) relates to a previously-described example (e.g. one or more of examples 1-4), wherein the writing comprises: sending the data unit to a first coherent fabric; and sending the data unit from the first coherent fabric to the shared line segments of the shared line.

Another example (e.g. example 6) relates to a previously-described example (e.g. one or more of examples 1-5), wherein the sending of the data unit from the first processor to the second processor is preceded by: retrieving, by the first processor, a previous version of the data unit from the shared memory; modifying, by the first processor, the previous version of the data unit to provide the data unit; and generating, by the second processor, a request to retrieve the data unit.

Another example (e.g. example 7) relates to a previously-described example (e.g. one or more of examples 1-6), wherein the shared memory is a shared cache memory.

Another example (e.g. example 8) relates to a previously-described example (e.g. one or more of examples 1-7), wherein the sending of the data unit from the first processor to the second processor occurs before the first processor sends the data unit to the shared memory.

Another example (e.g. example 9) relates to a previously-described example (e.g. one or more of examples 1-8), further comprising: sending another data unit from a third processor to a fourth processor using the augmented hardware cache coherency protocol, a size of the other data unit being a fraction of the size of shared line segments of another shared memory; and writing the other data unit to a shared line segment of a shared line of the other shared memory using the second protocol without overwriting another shared line segment of the shared line of the other shared memory, the writing being based at least in part on the dirty bits information, wherein the first processor and the second processor belong to a first cluster of processing units, and wherein the third processor and the fourth processor belong to a second cluster of processing units.

Another example (e.g. example 10) relates to a previously-described example (e.g. one or more of examples 1-9), wherein the first shared memory and the second shared memory are coupled to a further memory via a second coherent fabric.

An example (e.g. example 11) is a device having overwriting prevention capabilities of line segments, the device comprising: a shared memory; a first processor; and a second processor, wherein the first processor is configured to send a data unit to the second processor using a first protocol that comprises an augmented hardware cache coherency protocol, the augmented hardware cache coherency protocol maintaining dirty bits information during an exchange of the data unit within a cache coherency domain that comprises the first processor and the second processor, a size of the data unit being a fraction of a size of the shared line segments of the shared memory, wherein the device is configured to write the data unit to a shared line segment of the shared memory using a second protocol that is different than the augmented hardware cache coherency protocol without overwriting another shared segment of the shared line, the writing being based at least in part on the dirty bits information, and wherein the second protocol does not support hardware coherency and maintains the dirty bits information.

Another example (e.g. example 12) relates to a previously-described example (e.g. example 11), wherein the device is configured to write, via a processing entity that is outside the cache coherency domain, a further data unit to the other shared line segment of the shared line.

Another example (e.g. example 13) relates to a previously-described example (e.g. one or more of examples 11-12), wherein the processing entity is a hardware accelerator.

Another example (e.g. example 14) relates to a previously-described example (e.g. one or more of examples 11-13), wherein the second protocol comprises an advanced extensible interface (AXI) protocol, and wherein the first protocol comprises an augmented hardware coherency protocol that is an AXI coherency extension (ACE) protocol.

Another example (e.g. example 15) relates to a previously-described example (e.g. one or more of examples 11-14), wherein the device is configured to write the data unit by sending the data unit to a first coherent fabric, and to send the data unit from the first coherent fabric to the shared line segments of the shared line.

Another example (e.g. example 16) relates to a previously-described example (e.g. one or more of examples 11-15), wherein the first processor and second processor are configured to, prior to sending the data unit from the first processor to the second processor: retrieve, by the first processor, a previous version of the data unit from the shared memory; modify, by the first processor, the previous version of the data unit to provide the data unit; and generate, by the second processor, a request to retrieve the data unit.

Another example (e.g. example 17) relates to a previously-described example (e.g. one or more of examples 11-16), wherein the shared memory is a shared cache memory.

Another example (e.g. example 18) relates to a previously-described example (e.g. one or more of examples 11-17), wherein the first processor is configured to send the data unit from the first processor to the second processor before the first processor sends the data unit to the shared memory.

Another example (e.g. example 19) relates to a previously-described example (e.g. one or more of examples 11-18) further comprising: a third processor configured to: send another data unit to a fourth processor using the augmented hardware cache coherency protocol, the size of the other data unit being a fraction of the size of shared line segments of another shared memory; and write the other data unit to a shared line segment of a shared line of the other shared memory using the second protocol without overwriting another shard line segment of the shared line, the writing being based at least in part on the dirty bits information, wherein the first processor and the second processor belong to a first cluster of processing units, and wherein the third processor and the fourth processor belong to a second cluster of processing units.

Another example (e.g. example 20) relates to a previously-described example (e.g. one or more of examples 11-19), wherein the first shared memory and the second shared memory are coupled to a further memory via a second coherent fabric.

An example (e.g. example 21) relates to a non-transitory computer readable medium associated with a device for preventing overwriting of shared line segments of a shared memory, the non-transitory computer readable medium storing instructions that, when executed by one or more processors of the device, cause the device to: send a data unit from a first processor to second processor using a first protocol that comprises an augmented hardware cache coherency protocol, the augmented hardware cache coherency protocol maintaining dirty bits information during an exchange of the data unit within a cache coherency domain, a size of the data unit being a fraction of a size of the shared line segments of the shared memory; and write the data unit to a shared line segment of the shared memory using a second that is different than the augmented hardware cache coherency protocol without overwriting another shared line segment of the shared line, the writing being based at least in part on the dirty bits information, and wherein the second protocol does not support hardware coherency and maintains the dirty bits information.

An example (e.g. example 22) relates to a method for preventing overwriting of shared memory line segments of a shared memory, comprising: transmitting a data unit from a first processor to second processor, which are configured to operate within a cache coherency domain, using a first communication protocol that comprises an augmented hardware cache coherency protocol, the augmented hardware cache coherency protocol maintaining dirty bits information during an exchange of the data unit within the cache coherency domain; writing, based upon the dirty bits information, the data unit to a first shared memory line segment of a first shared memory using a second communication protocol that is different than the augmented hardware cache coherency protocol without overwriting a second shared memory line segment of the first shared memory; wherein the second communication protocol does not support hardware coherency and maintains the dirty bits information.

Another example (e.g. example 23) relates to a previously-described example (e.g. example 22), further comprising: writing, via a processing entity that is outside the cache coherency domain, a further data unit to the second shared memory line segment of the first shared memory.

Another example (e.g. example 24) relates to a previously-described example (e.g. one or more of examples 22-23), wherein a size of the data unit is a fraction of a size of the first shared memory line segment of the first shared memory.

Another example (e.g. example 25) relates to a previously-described example (e.g. one or more of examples 22-24), wherein the first communication protocol comprises an AXI coherency extension (ACE) protocol, and wherein the second communication protocol comprises an advanced extensible interface (AXI) protocol.

Another example (e.g. example 26) relates to a previously-described example (e.g. one or more of examples 22-25), wherein the act of writing the data unit comprises: transmitting the data unit to a first coherent fabric; and transmitting the data unit from the first coherent fabric to the first shared memory line segment of the first shared memory.

Another example (e.g. example 27) relates to a previously-described example (e.g. one or more of examples 22-26), wherein the act of transmitting the data unit from the first processor to the second processor is preceded by: retrieving, by the first processor, a previous version of the data unit from the first shared memory; modifying, by the first processor, the previous version of the data unit to provide the data unit; and generating, by the second processor, a request to retrieve the data unit.

Another example (e.g. example 28) relates to a previously-described example (e.g. one or more of examples 22-27), wherein the first shared memory is a shared cache memory.

Another example (e.g. example 29) relates to a previously-described example (e.g. one or more of examples 22-28), wherein the act of transmitting the data unit from the first processor to the second processor occurs before the first processor transmits the data unit to the first shared memory.

Another example (e.g. example 30) relates to a previously-described example (e.g. one or more of examples 22-29), further comprising: transmitting a further data unit from a third processor to a fourth processor using the augmented hardware cache coherency protocol; and writing, based upon the dirty bits information, the further data unit to the second shared memory line segment of the first shared memory using the second communication protocol without overwriting the first shared memory line segment of the first shared memory, wherein the first processor and the second processor belong to a first processing unit cluster, and wherein the third processor and the fourth processor belong to a second processing unit cluster.

Another example (e.g. example 31) relates to a previously-described example (e.g. one or more of examples 22-30), wherein the first shared memory is coupled to a further shared memory via a coherent fabric.

An example (e.g. example 32) relates to a device, comprising: a first shared memory; a first processor; and a second processor, wherein the first processor and the second processor are configured to operate within a cache coherency domain, wherein the first processor is configured to transmit a data unit to the second processor using a first protocol that comprises an augmented hardware cache coherency protocol, the augmented hardware cache coherency protocol maintaining dirty bits information during an exchange of the data unit within the cache coherency domain, wherein the device is configured to write, based upon the dirty bits information, the data unit to a first shared memory line segment of the first shared memory using a second protocol that is different than the augmented hardware cache coherency protocol without overwriting a second shared memory line segment of the first shared memory, and wherein the second protocol does not support hardware coherency and maintains the dirty bits information.

Another example (e.g. example 33) relates to a previously-described example (e.g. example 32), wherein the device is configured to write, via a processing entity that is outside the cache coherency domain, a further data unit to the second shared memory line segment of the first shared memory.

Another example (e.g. example 34) relates to a previously-described example (e.g. one or more of examples 32-33), wherein a size of the data unit is a fraction of a size of the first shared memory line segment of the first shared memory.

Another example (e.g. example 35) relates to a previously-described example (e.g. one or more of examples 32-34), wherein the first protocol comprises an AXI coherency extension (ACE) protocol, and wherein the second protocol comprises an advanced extensible interface (AXI) protocol.

Another example (e.g. example 36) relates to a previously-described example (e.g. one or more of examples 32-35), wherein the device is configured to write the data unit by (i) transmitting the data unit to a first coherent fabric, and (ii) transmitting the data unit from the first coherent fabric to the first shared memory line segment of the first shared memory.

Another example (e.g. example 37) relates to a previously-described example (e.g. one or more of examples 32-36), wherein the first processor and the second processor are configured to, prior to transmitting the data unit from the first processor to the second processor: retrieve, by the first processor, a previous version of the data unit from the first shared memory; modify, by the first processor, the previous version of the data unit to provide the data unit; and generate, by the second processor, a request to retrieve the data unit.

Another example (e.g. example 38) relates to a previously-described example (e.g. one or more of examples 32-37), wherein the first shared memory is a shared cache memory.

Another example (e.g. example 39) relates to a previously-described example (e.g. one or more of examples 32-38), wherein the first processor is configured to transmit the data unit from the first processor to the second processor before the first processor transmits the data unit to the first shared memory.

Another example (e.g. example 40) relates to a previously-described example (e.g. one or more of examples 32-39), further comprising: a third processor configured to: transmit a further data unit to a fourth processor using the augmented hardware cache coherency protocol; and write the further data unit to the second shared memory line segment of the first shared memory without overwriting the first shared memory line segment of the first shared memory, wherein the first processor and the second processor belong to a first processing unit cluster, and wherein the third processor and the fourth processor belong to a second processing unit cluster.

Another example (e.g. example 41) relates to a previously-described example (e.g. one or more of examples 32-40), wherein the first shared memory is coupled to a further shared memory via a coherent fabric.

An apparatus as shown and described.

A method as shown and described.

CONCLUSION

Any of the mentioned above memory or storage units may be implemented using any known technologies such as a volatile or nonvolatile memory including semiconductor-based memory units such as flash memory, EEPROM, EPROM, ROM; ferromagnetic digital memories; MRAM; volatile storage media including registers, buffers or caches, main memory, RAM, DRAM, SRAM, etc.

Any reference to any of the terms "comprise", "comprises", "comprising" "including", "may include" and "includes" may be applied to any of the terms "consists", "consisting", "and consisting essentially of". For example— any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

The disclosure may also be implemented in a computer program for running on a computer system, at least including code portions for performing steps of a method according to the disclosure when run on a programmable apparatus, such as a computer system or enabling a programmable apparatus to perform functions of a device or system according to the disclosure. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the disclosure has been described with reference to specific examples of embodiments of the disclosure. It will, however, be evident that various modifications and changes may be made therein without departing from the broader spirit and scope of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level-one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level-one, the logically false state is a logic level zero. And if the logically true state is a logic level zero, the logically false state is a logic level-one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the disclosure is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed is:

1. A method for preventing overwriting of shared memory line segments of a shared memory, comprising:
    transmitting a data unit from a first processor to second processor, which are configured to operate within a cache coherency domain, using a first communication protocol that comprises an augmented hardware cache coherency protocol, the augmented hardware cache coherency protocol maintaining dirty bits information during an exchange of the data unit within the cache coherency domain;
    writing, based upon the dirty bits information, the data unit to a first shared memory line segment of a first shared memory using a second communication protocol that is different than the augmented hardware cache coherency protocol without overwriting a second shared memory line segment of the first shared memory;
    wherein the second communication protocol does not support hardware coherency and maintains the dirty bits information.

2. The method according to claim 1, further comprising:
    writing, via a processing entity that is outside the cache coherency domain, a further data unit to the second shared memory line segment of the first shared memory.

3. The method according to claim 1, wherein a size of the data unit is a fraction of a size of the first shared memory line segment of the first shared memory.

4. The method according to claim 1, wherein the first communication protocol comprises an AXI coherency extension (ACE) protocol, and
    wherein the second communication protocol comprises an advanced extensible interface (AXI) protocol.

5. The method according to claim 1, wherein the act of writing the data unit comprises:
    transmitting the data unit to a first coherent fabric; and
    transmitting the data unit from the first coherent fabric to the first shared memory line segment of the first shared memory.

6. The method according to claim 5, wherein the act of transmitting the data unit from the first processor to the second processor is preceded by:
    retrieving, by the first processor, a previous version of the data unit from the first shared memory;
    modifying, by the first processor, the previous version of the data unit to provide the data unit; and
    generating, by the second processor, a request to retrieve the data unit.

7. The method according to claim 1, wherein the first shared memory is a shared cache memory.

8. The method according to claim 1, wherein the act of transmitting the data unit from the first processor to the second processor occurs before the first processor transmits the data unit to the first shared memory.

9. The method according to claim 1, further comprising:
    transmitting a further data unit from a third processor to a fourth processor using the augmented hardware cache coherency protocol; and
    writing, based upon the dirty bits information, the further data unit to the second shared memory line segment of the first shared memory using the second communication protocol without overwriting the first shared memory line segment of the first shared memory,
    wherein the first processor and the second processor belong to a first processing unit cluster, and
    wherein the third processor and the fourth processor belong to a second processing unit cluster.

10. The method according to claim 9, wherein the first shared memory is coupled to a further shared memory via a coherent fabric.

11. A device, comprising:
    a first shared memory;
    a first processor; and
    a second processor,
    wherein the first processor and the second processor are configured to operate within a cache coherency domain,
    wherein the first processor is configured to transmit a data unit to the second processor using a first protocol that comprises an augmented hardware cache coherency protocol, the augmented hardware cache coherency protocol maintaining dirty bits information during an exchange of the data unit within the cache coherency domain,
    wherein the device is configured to write, based upon the dirty bits information, the data unit to a first shared memory line segment of the first shared memory using a second protocol that is different than the augmented hardware cache coherency protocol without overwriting a second shared memory line segment of the first shared memory, and
    wherein the second protocol does not support hardware coherency and maintains the dirty bits information.

12. The device according to claim 11, wherein the device is configured to write, via a processing entity that is outside the cache coherency domain, a further data unit to the second shared memory line segment of the first shared memory.

13. The device according to claim 11, wherein a size of the data unit is a fraction of a size of the first shared memory line segment of the first shared memory.

14. The device according to claim 11, wherein the first protocol comprises an AXI coherency extension (ACE) protocol, and
    wherein the second protocol comprises an advanced extensible interface (AXI) protocol.

15. The device according to claim 11, wherein the device is configured to write the data unit by (i) transmitting the data unit to a first coherent fabric, and (ii) transmitting the data unit from the first coherent fabric to the first shared memory line segment of the first shared memory.

16. The device according to claim 15, wherein the first processor and the second processor are configured to, prior to transmitting the data unit from the first processor to the second processor:

retrieve, by the first processor, a previous version of the data unit from the first shared memory;

modify, by the first processor, the previous version of the data unit to provide the data unit; and generate, by the second processor, a request to retrieve the data unit.

17. The device according to claim 11, wherein the first shared memory is a shared cache memory.

18. The device according to claim 11, wherein the first processor is configured to transmit the data unit from the first processor to the second processor before the first processor transmits the data unit to the first shared memory.

19. The device according to claim 11, further comprising:
a third processor configured to:
  transmit a further data unit to a fourth processor using the augmented hardware cache coherency protocol; and
  write the further data unit to the second shared memory line segment of the first shared memory without overwriting the first shared memory line segment of the first shared memory,
wherein the first processor and the second processor belong to a first processing unit cluster, and
wherein the third processor and the fourth processor belong to a second processing unit cluster.

20. The device according to claim 19, wherein the first shared memory is coupled to a further shared memory via a coherent fabric.

* * * * *